(12) United States Patent
Kikuchi et al.

(10) Patent No.: US 8,294,854 B2
(45) Date of Patent: *Oct. 23, 2012

(54) LIQUID CRYSTAL DISPLAY COMPRISING A REFLECTION REGION HAVING FIRST, SECOND AND THIRD RECESSES AND METHOD FOR MANUFACTURING THE SAME

(75) Inventors: Tetsuo Kikuchi, Matsusaka (JP); Hajime Imai, Matsusaka (JP); Hideki Kitagawa, Tsu (JP); Mitsunori Imade, Matsusaka (JP); Yoshihito Hara, Taki-gun (JP); Junya Shimada, Taki-gun (JP); Takao Matsumoto, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 987 days.

This patent is subject to a terminal disclaimer.

(21) Appl. No.: 12/299,154

(22) PCT Filed: Apr. 5, 2007

(86) PCT No.: PCT/JP2007/057675
§ 371 (c)(1),
(2), (4) Date: Oct. 31, 2008

(87) PCT Pub. No.: WO2007/129519
PCT Pub. Date: Nov. 15, 2007

(65) Prior Publication Data
US 2009/0185119 A1    Jul. 23, 2009

(30) Foreign Application Priority Data

May 1, 2006 (JP) .................................. 2006-127682
Dec. 13, 2006 (JP) .................................. 2006-336213

(51) Int. Cl.
*G02F 1/1335* (2006.01)

(52) U.S. Cl. ........................................................ 349/113
(58) Field of Classification Search .................. 349/113, 349/114
See application file for complete search history.

(56) References Cited

U.S. PATENT DOCUMENTS 6,208,395 B1    3/2001    Kanoh et al.
6,839,107 B2    1/2005    Kobashi
(Continued)

FOREIGN PATENT DOCUMENTS

JP    11-237625 A    8/1999
(Continued)

OTHER PUBLICATIONS

Official Communication issued in International Patent Application No. PCT/JP2007/057675, mailed on Jul. 3, 2007.
(Continued)

*Primary Examiner* — Mark Robinson
*Assistant Examiner* — Dennis Y Kim
(74) *Attorney, Agent, or Firm* — Keating & Bennett, LLP

(57) ABSTRACT

A liquid crystal display device includes a reflection region for reflecting incident light toward a display surface, wherein, the reflection region includes a metal layer formed on a substrate, a semiconductor layer formed above the metal layer, and a reflective layer formed above the semiconductor layer; and the reflection region includes a first recess formed on a surface of the reflective layer, a second recess formed on the surface of the reflective layer in the first recess, and a third recess formed on the surface of the reflective layer in the second recess. The liquid crystal display device provides a low-cost transflective-type or reflection-type liquid crystal display device having a high image quality.

32 Claims, 12 Drawing Sheets

U.S. PATENT DOCUMENTS

| | | | |
|---|---|---|---|
| 6,891,586 B2 * | 5/2005 | Anno et al. | 349/113 |
| 7,106,403 B2 * | 9/2006 | Murai et al. | 349/114 |
| 2002/0113927 A1 * | 8/2002 | Ha et al. | 349/113 |
| 2003/0089949 A1 | 5/2003 | Lin et al. | |
| 2004/0021810 A1 * | 2/2004 | Kawaguri et al. | 349/113 |
| 2004/0027702 A1 * | 2/2004 | Matsushita et al. | 359/883 |
| 2004/0195574 A1 * | 10/2004 | Ahn et al. | 257/72 |
| 2005/0122452 A1 * | 6/2005 | Yoshida et al. | 349/114 |
| 2005/0190322 A1 | 9/2005 | Okabe et al. | |
| 2005/0206825 A1 * | 9/2005 | Kaneko et al. | 349/141 |
| 2005/0270447 A1 | 12/2005 | Tasaka et al. | |
| 2005/0270450 A1 * | 12/2005 | Ahn et al. | 349/114 |
| 2006/0238676 A1 * | 10/2006 | Yang et al. | 349/114 |
| 2009/0195740 A1 * | 8/2009 | Imai et al. | 349/113 |
| 2010/0014031 A1 * | 1/2010 | Kikuchi et al. | 349/113 |
| 2010/0045885 A1 * | 2/2010 | Imai et al. | 349/39 |

FOREIGN PATENT DOCUMENTS

| | | | |
|---|---|---|---|
| JP | 2003-149679 A | 5/2003 | |
| JP | 2005-055808 A | 3/2005 | |
| JP | 2005-157105 A | 6/2005 | |
| JP | 2005-345757 A | 12/2005 | |

OTHER PUBLICATIONS

Imai et al.: "Liquid Crystal Display and Method of Manufacturing Liquid Crystal Display," U.S. Appl. No. 12/299,138, filed Oct. 31, 2008.

English translation of the official communication issued in counterpart International Application No. PCT/JP2007/057675, mailed on Nov. 27, 2008.

Kikuchi et al., "Liquid Crystal Display Device and Process for Producing Liquid Crystal Display Device," U.S. Appl. No. 12/518,719, filed Jun. 11, 2009.

Imai et al., "Liquid Crystal Display Device," U.S. Appl. No. 12/523,935, filed Jul. 21, 2009.

* cited by examiner

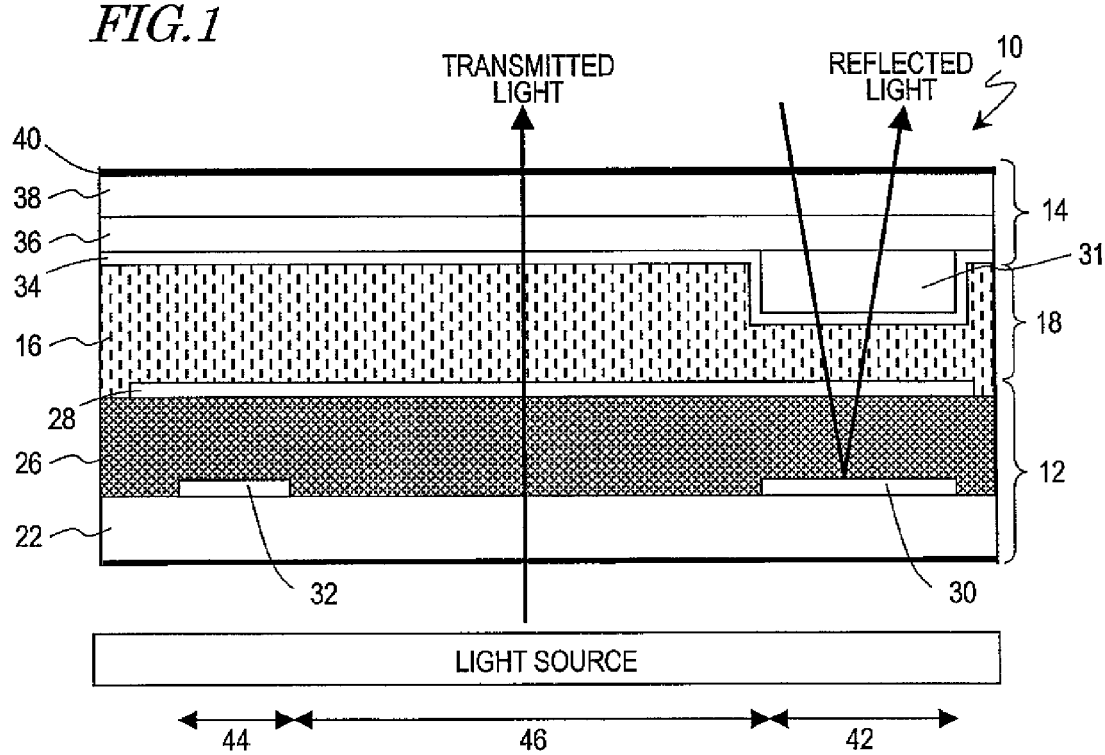

LIQUID CRYSTAL DISPLAY COMPRISING A REFLECTION REGION HAVING FIRST, SECOND AND THIRD RECESSES AND METHOD FOR MANUFACTURING THE SAME

BACKGROUND OF THE INVENTION

1. Field of the Invention

The present invention relates to a reflection-type or transflective-type liquid crystal display device which can perform display by utilizing reflected light.

2. Description of the Related Art

Liquid crystal display devices (LCDs) include the transmission-type LCD which utilizes backlight from behind the display panel as a light source for displaying, the reflection-type LCD which utilizes reflected light of external light, and the transflective-type LCD (reflection/transmission-type LCD) which utilizes both reflected light of external light and backlight. The reflection-type LCD and the transflective-type LCD are characterized in that they have smaller power consumptions than that of the transmission-type LCD, and their displayed images are easy to see in a bright place. The transflective-type LCD is characterized in that their displayed images are easier to see than that of the reflection-type LCD, even in a dark place.

FIG. 17 is a cross-sectional view showing an active matrix substrate 100 in a conventional reflection-type LCD (e.g., Japanese Laid-Open Patent Publication No. 9-54318).

As show in this figure, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and the metal layer 108 are subjected to etching by using one mask, thus being formed so as to have an island-like multilayer structure. Thereafter, the reflective layer 110 is formed on this multilayer structure, whereby a reflection surface 112 having roughened portions is formed. Although not shown, transparent electrodes, a liquid crystal panel, a color filter substrate (CF substrate), and the like are formed above the active matrix substrate 100.

FIG. 18 is a cross-sectional view of a conventional transflective-type liquid crystal display device (e.g., Japanese Laid-Open Patent Publication No. 2005-277402).

As shown in this figure, in the conventional transflective-type liquid crystal display device, an interlayer insulating film 204 is formed above a drain electrode 222 of a switching element (TFT) 203, and a galvanic corrosion preventing film 205, a reflection electrode film 206, and an amorphous transparent electrode film 218 are stacked on the interlayer insulating film 204. The region where the reflection electrode film 206 is formed is a reflection region of the transflective-type liquid crystal display device. Roughened portions are formed in an upper portion of the interlayer insulating film 204 in the reflection region. Corresponding to these roughened portions, roughened portions are also formed on the galvanic corrosion preventing film 205, the reflection electrode film 206, and the amorphous transparent electrode film 218.

In the aforementioned active matrix substrate 100, portions of the reflective layer 110 are formed so as to reach the insulative substrate 101 in portions where the gate layer 102 and the like are not formed (i.e., portions between the islands, hereinafter referred to as "gap portions"). Therefore, in the gap portions, the surface of the reflection surface 112 is recessed in the direction of the insulative substrate 101, thus forming a surface having deep dents (or recesses).

In the reflection-type liquid crystal display device or the transflective-type liquid crystal display device, in order to perform bright display by utilizing reflected light, it is necessary to allow incident light entering from various directions to be reflected by the reflection surface 112 more uniformly and efficiently over the entire display surface. For this purpose, it is better if the reflection surface 112 is not completely planar but has moderately roughened portions.

However, the reflection surface 112 of the aforementioned active matrix substrate 100 has deep dents. Therefore, light is unlikely to reach the reflection surface located on the bottoms of the dents, and even if at all light reaches there, the reflected light thereof is unlikely to be reflected toward the liquid crystal panel, thus resulting in a problem in that the reflected light is not effectively used for displaying. Furthermore, there is a problem in that, since many portions of the reflection surface 110 have a large angle relative to the display surface of the liquid crystal display device, the reflected light from those portions is not effectively utilized for displaying.

FIGS. 19A and 19B are diagrams showing a relationship between the tilt of the reflection surface 112 and the outgoing angle of reflected light. FIG. 19A shows a relationship between an incident angle a and an outgoing angle S when light enters a medium b having a refractive index Nb from a medium a having a refractive index Na. In this case, according to Snell's Law, the following relationship holds true.

$Na^* \sin \alpha = Nb^* \sin \beta$

FIG. 19B is a diagram showing a relationship between incident light and reflected light when incident light perpendicularly entering the display surface of an LCD is reflected from a reflection surface which is tilted by θ with respect to the display surface (or the substrate). As shown in the figure, the incident light perpendicularly entering the display surface is reflected from the reflection surface which is tilted by angle θ with respect to the display surface, and goes out in a direction of an outgoing angle φ.

According to Snell's Law, results of calculating the outgoing angle φ according to Snell's Law with respect to each angle θ of the reflection surface are shown in Table 1.

TABLE 1

| Θ | φ | 90 - φ |
|---|---|--------|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle θ of the reflection surface exceeds 20 degrees, the outgoing angle φ becomes very large (i.e., 90-φ becomes very small), so that most of the outgoing light does not reach the user. Therefore, even if roughened portions are provided on the reflection surface of the reflective layer, it is necessary to ensure that the angle θ is 20 degrees or less in greater portions of the reflection surface in order to effectively use the reflected light.

Since the reflection surface 112 of the aforementioned active matrix substrate 100 has many portions which are greater than 20 degrees, reflected light is not very effectively used for displaying. In order to solve this problem, it might be possible to form an insulating layer under the reflective layer 110, and form the reflective layer 110 over the insulating layer. However, in this case, a step of forming an insulating layer, and a step of forming contact holes for connecting the reflective layer 110 to the drains of TFTs in the insulating layer are needed, thus resulting in a problem of an increase in the material and the number of manufacturing steps.

Moreover, the aforementioned conventional transflective-type liquid crystal display device requires a step of stacking the interlayer insulating film 204 on the drain electrode 222 and then forming roughened portions in an upper portion thereof, and further a step of stacking thereupon the galvanic corrosion preventing film 205, the reflection electrode film 206, and the amorphous transparent electrode film 218. Thus, the conventional transflective-type liquid crystal display device also has a problem in that the material and number of steps are increased for forming the reflection region.

Furthermore, in the conventional transflective-type liquid crystal display device, roughened portions are formed on the surface of the amorphous transparent electrode film 218, which is in contact with the liquid crystal layer 211. Therefore, an electric field which is applied across the liquid crystal layer 211 does not become uniform, and it is difficult to control the orientation of the liquid crystal in the reflection region uniformly in a desired direction. Moreover, a slope conforming to the end shape of the interlayer insulating film 204 is formed at an end of the amorphous transparent electrode film 218. There is also a problem in that this slope disturbs the orientation of the liquid crystal near the end of the reflection region.

SUMMARY OF THE INVENTION

In view of the above problems, preferred embodiments of the present invention provide a low-cost reflection-type or transflective-type liquid crystal display device having a high image quality.

A liquid crystal display device according to a preferred embodiment of the present invention is a liquid crystal display device including a reflection region for reflecting incident light toward a display surface, wherein, the reflection region includes a reflective layer located on a substrate; and the reflection region includes a first recess formed on a surface of the reflective layer, a second recess formed on the surface of the reflective layer in the first recess, and a third recess formed on the surface of the reflective layer in the second recess.

In one preferred embodiment, a surface which is parallel or substantially parallel to the plane of the substrate is formed on the surface of the reflective layer inside the first recess but outside the second recess.

In one preferred embodiment, a surface which is parallel or substantially parallel to the plane of the substrate is formed on the surface of the reflective layer inside the second recess but outside the third recess.

In one preferred embodiment, a metal layer having an aperture is formed under the reflective layer in the reflection region.

In one preferred embodiment, the metal layer has a first portion and a second portion which is thicker than the first portion.

In one preferred embodiment, an insulating layer is formed above the metal layer and the aperture of the metal layer.

In one preferred embodiment, a semiconductor layer having an aperture is formed above the insulating layer.

In one preferred embodiment, the aperture of the semiconductor layer is located inside the aperture of the metal layer.

In one preferred embodiment, a semiconductor device formed on the substrate is provided, wherein, the metal layer, the semiconductor layer, and the reflective layer are composed of same materials as those of a gate electrode, a semiconductor portion, and source/drain electrodes of the semiconductor device.

In one preferred embodiment, a plurality of the first recesses, second recesses, and third recesses are formed in the reflection region.

In one preferred embodiment, at least one of the first recess, the second recess, and the third recess has a circular or substantially circular shape.

In one preferred embodiment, at least one of the first recess, the second recess, and the third recess has an elliptical or substantially elliptical shape.

In one preferred embodiment, at least one of the first recess, the second recess, and the third recess has a quadrangular or substantially quadrangular shape.

In one preferred embodiment, a liquid crystal layer and an interlayer insulating layer and a pixel electrode provided between the liquid crystal layer and the reflective layer are provided, wherein a surface of the pixel electrode facing the liquid crystal layer is flat, without conforming to shapes of the first recess, the second recess, and the third recess of the reflective layer.

In one preferred embodiment, the metal layer includes a first metal layer and a second metal layer which is formed above the first metal layer and composed of a material different from that of the first metal layer; the first metal layer and the second metal layer each have an aperture; and the aperture of the first metal layer is formed inside the aperture of the second metal layer.

In one preferred embodiment, the first metal layer is composed of aluminum and the second metal layer is composed of molybdenum.

In one preferred embodiment, the metal layer includes a third metal layer which is formed above the second metal layer and composed of a material different from those of the first metal layer and the second metal layer; the third metal layer has an aperture; and the aperture of the second metal layer is formed inside the aperture of the third metal layer.

In one preferred embodiment, the first metal layer is composed of aluminum; the second metal layer is composed of molybdenum nitride; and the third metal layer is composed of molybdenum.

A liquid crystal display device according to another preferred embodiment of the present invention is a liquid crystal display device including a reflection region for reflecting incident light toward a display surface, wherein, the reflection region includes a metal layer having an aperture and a reflective layer formed above the metal layer; the reflection region includes a first recess formed on a surface of the reflective layer and a second recess formed on the surface of the reflective layer in the first recess; and a level difference is formed on a slope of the aperture of the metal layer, the first recess and the second recess being formed according to the slope of the aperture of the metal layer.

Another liquid crystal display device according to a further preferred embodiment of the present invention is a liquid crystal display device including a reflection region for reflecting incident light toward a display surface, wherein, the reflection region includes a metal layer having an aperture, a semiconductor layer being formed above the metal layer and having an aperture, and a reflective layer formed above the semiconductor layer; the reflection region includes a first recess formed on a surface of the reflective layer, and a second recess formed on the surface of the reflective layer in the first recess; at least one of the first recess and the second recess is formed according to the aperture of the metal layer, and the other of the first recess and the second recess is formed according to the aperture of the semiconductor layer; and a side surface of the aperture of the metal layer includes a plane whose tilting angle with respect to the display surface is about 20 degrees or less, for example.

In one preferred embodiment, the metal layer has a composition which changes along a thickness direction of the metal layer.

In one preferred embodiment, the metal layer is composed of molybdenum nitride, and a nitrogen content in the molybdenum nitride of the metal layer changes along the thickness direction of the metal layer.

A production method for a liquid crystal display device according to another preferred embodiment of the present invention is a production method for a liquid crystal display device having a reflection region for reflecting incident light toward a display surface, including: a step of forming a metal layer having an aperture and including a first portion and a second portion which is thicker than the first portion, in the reflection region; a step of forming an insulating layer, above the metal layer and the aperture of the metal layer; a step of forming a semiconductor layer having an aperture, above the insulating layer; and a step of forming a reflective layer, above the semiconductor layer and the aperture of the semiconductor layer.

In one preferred embodiment, the aperture of the semiconductor layer is formed inside the aperture of the metal layer.

In one preferred embodiment, a first recess is formed on a surface of the reflective layer; a second recess is formed on the surface of the reflective layer inside the first recess; and a third recess is formed on the surface of the reflective layer inside the second recess.

In one preferred embodiment, the first recess is formed on the surface of the reflective layer above the aperture of the metal layer.

In one preferred embodiment, the third recess is formed on the surface of the reflective layer above the aperture of the semiconductor layer.

In one preferred embodiment, the metal layer and the semiconductor layer each have a plurality of apertures.

In one preferred embodiment, at least one of the aperture of the metal layer and the aperture of the semiconductor layer has a circular or substantially circular shape.

In one preferred embodiment, at least one of the aperture of the metal layer and the aperture of the semiconductor layer has an elliptical or substantially elliptical shape.

In one preferred embodiment, at least one of the aperture of the metal layer and the aperture of the semiconductor layer has a quadrangular or substantially quadrangular shape.

In one preferred embodiment, the liquid crystal display device includes a semiconductor device; and a gate electrode of the semiconductor device is formed in the step of forming the metal layer, a semiconductor section of the semiconductor device is formed in the step of forming the semiconductor layer, and source/drain electrodes of the semiconductor device are formed in the step of forming the semiconductor device.

In one preferred embodiment, a step of forming an interlayer insulating layer above the reflective layer and a step of forming a pixel electrode above the interlayer insulating layer are provided, wherein, a surface of the pixel electrode is formed to be flat, without conforming to shapes of the first recess, the second recess, and the third recess of the reflective layer.

In one preferred embodiment, the step of forming the metal layer includes a step of forming a first metal layer and a step of forming, from a material which is different from that of the first metal layer, a second metal layer above the first metal layer; an aperture is formed in each of the first metal layer and the second metal layer; and the aperture of the first metal layer is formed inside the aperture of the second metal layer.

In one preferred embodiment, the first metal layer is composed of aluminum, and the second metal layer is composed of molybdenum.

In one preferred embodiment, the step of forming the metal layer includes a step of forming a third metal layer above the second metal layer from a material which is different from those of the first metal layer and the second metal layer; and an aperture is formed in the third metal layer, and the aperture of the second metal layer is located inside the aperture of the third metal layer.

In one preferred embodiment, the first metal layer is composed of aluminum; the second metal layer is composed of molybdenum nitride; and the third metal layer is composed of molybdenum.

Another production method for a liquid crystal display device according to yet another preferred embodiment of the present invention is a production method for a liquid crystal display device having a reflection region for reflecting incident light toward a display surface, including: a step of forming a metal layer having a first portion and a second portion which is thicker than the first portion, in the reflection region; a step of forming an insulating layer, above the metal layer; a step of forming a semiconductor layer, above the insulating layer; and a step of forming a reflective layer, above the semiconductor layer, wherein, a slope having a level difference is formed in the metal layer, and, on a surface of the reflective layer, a first recess and a second recess which is located in the first recess are formed according to the slope of the metal layer.

Another production method for a liquid crystal display device according to a further preferred embodiment of the present invention is a production method for a liquid crystal display device having a reflection region for reflecting incident light toward a display surface, including: a step of forming a metal layer having an aperture, in the reflection region; a step of forming an insulating layer, above the metal layer; a step of forming a semiconductor layer having an aperture, above the insulating layer; and a step of forming a reflective layer, above the semiconductor layer, wherein, on a surface of the reflective layer, a first recess and a second recess which is located in the first recess are formed according to the aperture of the metal layer and the aperture of the semiconductor layer; and a side surface of the aperture of the metal layer is formed so as to include a plane whose tilting angle with respect to the display surface is about 20 degrees or less, for example.

In one preferred embodiment, in the step of forming the metal layer, a composition of the metal layer changes along a thickness direction of the metal layer.

In one preferred embodiment, the metal layer is composed of molybdenum nitride, and in the step of forming the metal layer, a nitrogen content in the molybdenum nitride of the metal layer decreases with time.

According to various preferred embodiments of the present invention, a low-cost transflective-type or reflection-type liquid crystal display device having a high image quality is provided.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1 is a diagram schematically showing a cross-sectional shape of the liquid crystal display device of Preferred Embodiment 1 of the present invention.

FIG. 2A shows the construction of pixel regions, and FIG. 2B shows the construction of a reflection section.

FIG. 3A shows the construction of a reflection section, and FIG. 3B shows the construction of a TFT section.

FIGS. 4A, 4B, and 4C are schematic diagrams for comparison of reflection section constructions between Preferred Embodiment 1 and a conventional liquid crystal display device, wherein FIG. 4A shows a cross section of a reflection section of Preferred Embodiment 1, FIG. 4B shows a cross section of a reflection section of the conventional liquid crystal display device, and FIG. 4C shows surface angles at a corner portion of the reflection section.

FIG. 19A shows a relationship between an incident angle $\alpha$ and an outgoing angle $\beta$ when light enters a medium b having a refractive index Nb from a medium a having a refractive index Na, and FIG. 19B is a diagram showing a relationship between incident light and reflected light as well as the angle of the display surface of the LCD.

DETAILED DESCRIPTION OF THE PREFERRED EMBODIMENTS

Preferred Embodiment 1

Figure 2A:
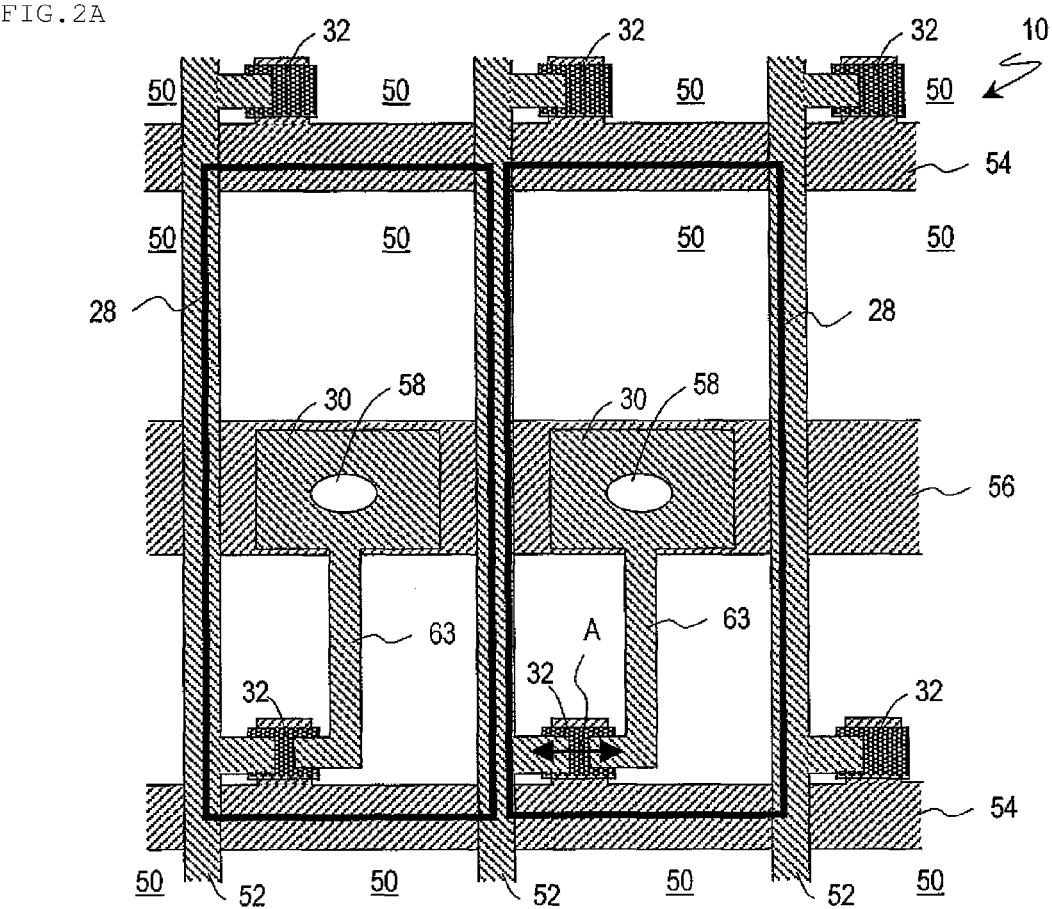
FIGS. 2A and 2B are plan views showing a liquid crystal display device of Preferred Embodiment 1, where

Hereinafter, with reference to the drawing, a first preferred embodiment of the liquid crystal display device according to the present invention will be described.

FIG. 1 is a diagram schematically showing a cross-sectional shape of a liquid crystal display device 10 of the present preferred embodiment. The liquid crystal display device 10 is a transflective-type liquid crystal display device (LCD) using an active matrix method. As shown in FIG. 1, the liquid crystal display device 10 includes a TFT (Thin Film Transistor) substrate 12, a counter substrate 14 such as a color filter substrate (CF substrate), and a liquid crystal layer 18 containing liquid crystal 16 which is sealed between the TFT substrate 12 and the counter substrate 14.

The TFT substrate 12 includes a transparent substrate 22, an interlayer insulating layer 26, and a pixel electrode 28, and includes reflection sections 30 and TFT sections 32. Note that gate lines (scanning lines), source lines (signal lines), and Cs lines (storage capacitor electrode lines) are also formed on the TFT substrate 12, which will be described later.

The counter substrate 14 includes a counter electrode 34, a color filter layer (CF layer) 36, and a transparent substrate 38. The upper surface of the transparent substrate 38 serves as a display surface 40 of the liquid crystal display device. Note that although the TFT substrate 12 and the counter substrate 14 each have an alignment film and a polarizer, they are omitted from the figure.

In the liquid crystal display device 10, a region where a reflection section 30 is formed is referred to as a reflection region 42, whereas a region where a TFT section 32 is formed is referred to as a TFT region 44. In a reflection region, light entering from the display surface 40 is reflected by the reflection section 30, and travels through the liquid crystal layer 18 and the counter substrate 14 so as to go out from the display surface 40. The liquid crystal display device 10 further has transmission regions 46 which are formed in regions other than the reflection regions 42 and the TFT regions 44. In the transmission regions 46, light which is emitted from a light source in the liquid crystal display device 10 travels through the TFT substrate 12, the liquid crystal layer 18, and the counter substrate 14 so as to go out from the display surface 40.

Note that, as shown in FIG. 1, by providing a layer 31 which is composed of a transmissive resin or the like at the counter substrate 14 side above each reflection section 30, it is possible to reduce the thickness of the liquid crystal layer 18 in the reflection region 42 to a half of the thickness of the liquid crystal layer 18 in the transmission region 46. As a result, the optical path lengths in the reflection region 42 and the transmission region 46 can be made equal. Although FIG. 1 illustrates the layer 31 as being formed between the counter electrode 34 and the CF layer 36, the layer 31 may be formed on the surface of the counter electrode 34 facing the liquid crystal layer 18.

Figure 2B:
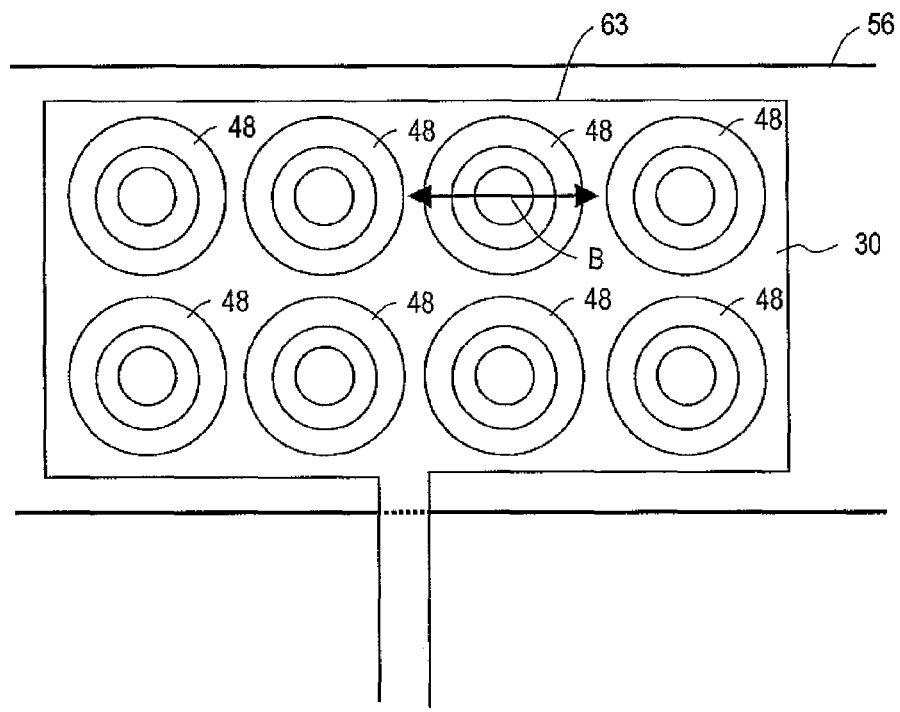

FIGS. 2A and 2B are plan views which show the construction of the pixel regions and the reflection sections 30 in the liquid crystal display device 10 more specifically.

FIG. 2A is a plan view of a portion of the liquid crystal display device 10, as seen from above the reflection surface 40. As shown in the figure, a plurality of pixels 50 are arranged in a matrix shape on the liquid crystal display device 10. The aforementioned reflection section 30 and TFT section 32 are formed in each pixel 50, with a TFT being formed in the TFT section 32.

In the border of the pixel 50, source lines 52 extend along the column direction (the top-bottom direction in the figure), and gate lines (gate metal layers) 54 extend along the row direction. In the central portion of the pixel 50, a Cs line (Cs metal layer) 56 extends along the row direction (the right-light direction in the figure). In the interlayer insulating layer 26 of the reflection section 30, a contact hole 58 for connecting the pixel electrode 28 and the drain electrode of the TFT is formed.

FIG. 2B is a plan view schematically showing the construction of the reflection section 30 above the Cs line 56. Note that the contact hole 58 is omitted from this figure. As shown in the figure, a plurality of circular recesses (tapered portions) 48 having level differences are formed in the reflection section 30. Note that although eight recesses 48 are shown herein for ease of understanding of the construction, the number of recesses 48 is not limited to eight, but more or less recesses 48 may be formed. Note that, as will be described later, a reflective layer 63 is formed in the reflection section 30, and the surface of the recesses 48 is formed as a surface of the reflective layer 63. The reflective layer 63 is connected to the drain electrode of the TFT in the TFT section 32.

Next, with reference to FIG. 3, the construction of the reflection section 30 and the TFT section 32 will be more specifically described.

Figure 3A:
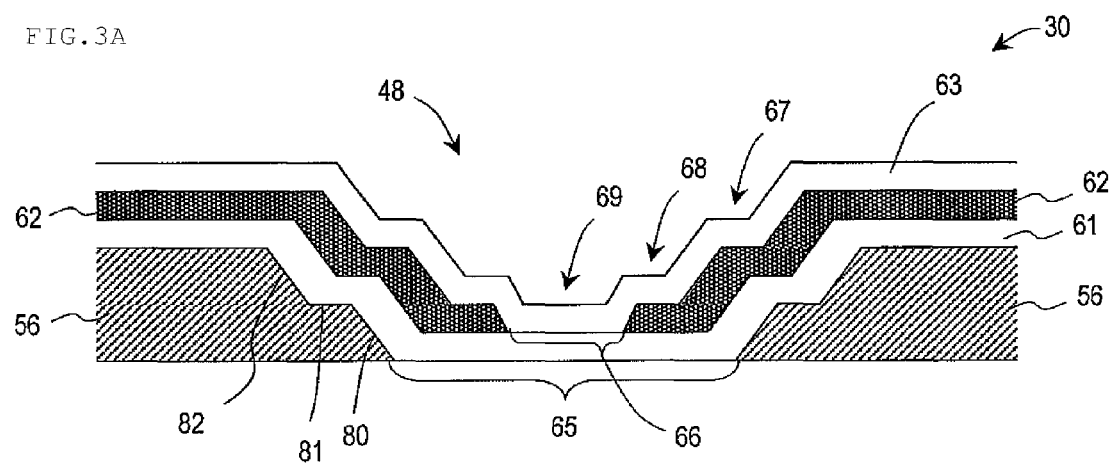
FIGS. 3A and 3B are cross-sectional views showing the construction of a TFT section and a reflection section of Preferred Embodiment 1, where

FIG. 3A shows a cross section of a recess 48 in the reflection section 30 (a cross section of a portion shown by arrow B in FIG. 2B). As shown in the figure, the Cs metal layer (metal layer) 56, the gate insulating layer (insulating layer) 61, the semiconductor layer 62, and the reflective layer 63, which are formed with level differences, are stacked in the reflection section 30. The semiconductor layer 62 is composed of an intrinsic amorphous silicon layer (Si(i)layer), and an n$^+$ amorphous silicon layer (Si(n$^+$)layer) doped with phosphorus, for example.

The Cs metal layer 56 has an aperture 65. At the periphery of the aperture 65 (between the edge of the aperture 65 and the upper surface of the Cs metal layer 56), a slope 80, a flat surface 81 which is parallel to the bottom surface of the Cs metal layer 56, and a slope 82 are formed. Moreover, the semiconductor layer 62 has an aperture 66 which is formed inside the aperture 65 of the Cs metal layer 56.

A recess 67 is formed on the surface of the reflective layer 63, and a recess 68 is formed on the surface of the reflective layer 63 inside the recess 67, and furthermore a recess 69 is formed on the surface of the reflective layer 63 inside the recess 68. When seen perpendicularly from the transparent substrate 22, the recess 67, the recess 68, and the recess 69 are preferably in the shape of concentric circles. Inside the recess 67, the reflective layer 63 is formed with double level differences. Inside the recess 67 but outside the recess 68, and inside the recess 68 but outside the recess 69, flat surfaces where the surface of the reflective layer 63 is generally parallel to the surface of the transparent substrate 22 are formed.

The recess 67 and the recess 68 are formed as the reflective layer 63 becomes dented because the reflective layer 63 is formed over the aperture 65 of the Cs metal layer 56 and its periphery via the gate insulating layer 61 and the semiconductor layer 62. The recess 69 is formed as the reflective layer 63 becomes dented because the reflective layer 63 is formed over the aperture 66 of the semiconductor layer 62. Note that, instead of the aperture 66, a recess may be formed in the semiconductor layer 62. In that case, the recess 69 will be formed according to the recess (including its side surface) of the semiconductor layer 62.

Figure 3B:
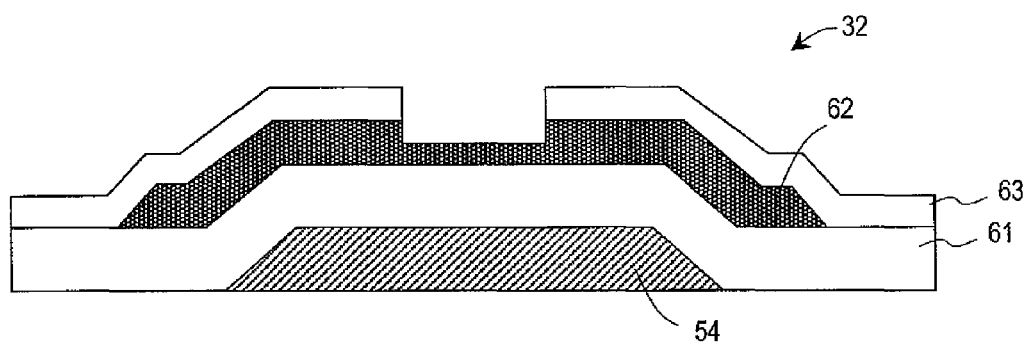

FIG. 3B is a diagram showing the construction of the gate metal layer (metal layer) 54, the gate insulating layer 61, the semiconductor layer 62, and the reflective layer 63 in the TFT section 32, which is a cross-sectional view showing a portion at arrow A in FIG. 2A. The gate metal layer 54 in the TFT section 32 is formed concurrently with and from the same member as the Cs metal layer 56 of the reflection section 30. Similarly, the gate insulating layer 61, the semiconductor layer 62, and the reflective layer 63 of the TFT section 32 are formed concurrently with and from the same members as the gate insulating layer 61, the semiconductor layer 62, and the reflective layer 63 of the reflection section 30, respectively.

Figure 4A:
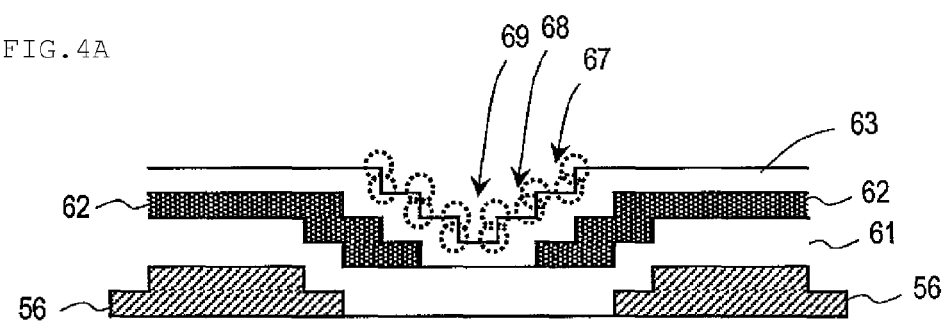
Figure 4B:
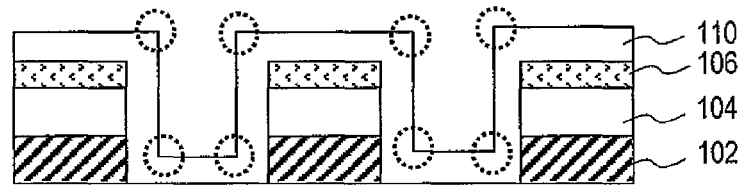
Figure 17:
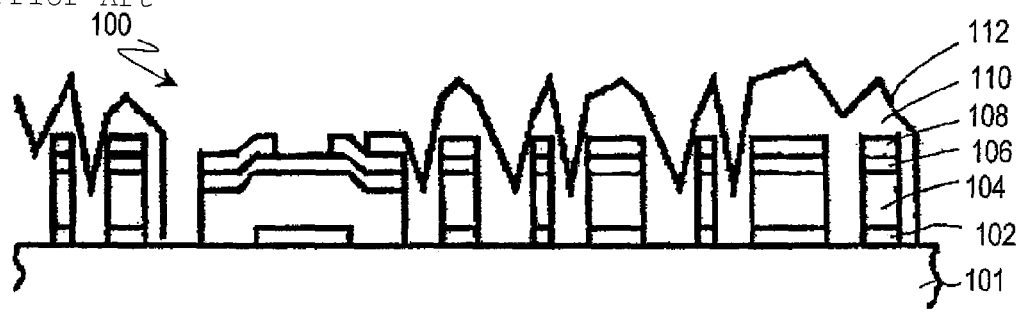
FIG. 17 is a cross-sectional view showing an active matrix substrate of a conventional reflection-type LCD.

FIGS. 4A and 4B are cross-sectional views for comparing the structures of the reflection section 30 of Preferred Embodiment 1 of the present invention and the reflection section of the conventional liquid crystal display device shown in FIG. 17. FIG. 4A schematically shows the structure of the reflection section 30 of Preferred Embodiment 1, whereas FIG. 4B shows the structure of the reflection section of the conventional liquid crystal display device. In these figures, for simplicity, the slopes of each layer in the reflection section 30 and the slopes of each layer of the conventional liquid crystal display device are illustrated as vertical surfaces. Moreover, the corner portion of each level difference (portions shown by dotted circles in the figure) is illustrated as bending at a right angle.

As shown in these figures, on the surface of the reflective layer 63 of the reflection section 30 of Preferred Embodiment 1, a total of twelve corner portions are formed at an edge of the upper surface and an edge of the bottom surface of each of the recesses 67, 68, and 69. On the other hand, in the conventional liquid crystal display device, only four corner portions are formed in one recess of the reflection section.

Figure 4C:
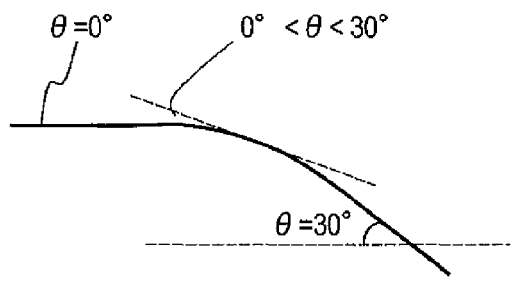

In FIGS. 4A and 4B, these corners are shown as right angles. However, in an actual corner portion, as shown in FIG. 4C, a surface having an angle greater than about 20 degrees (in this figure, exemplified as about 30 degrees) with respect to the substrate is continuously formed from a plane which is parallel (with an angle of θ degrees) to the substrate. Therefore, by forming more recesses in the reflection section, more surfaces having an angle of about 20 degrees or less with respect to the substrate (effective reflection surfaces) can be formed at the surface of the reflective layer.

Moreover, since the effective reflection surfaces which are formed at the corner portions have respectively different tilting angles, it is unlikely for the reflected light to head only in a constant direction. Therefore, by forming more recesses, more reflected light can be obtained that spreads over a broad range. Moreover, by increasing the number of recesses and ensuring that the tilting angles of the side surfaces of the recesses are about 20 degrees or less, even more reflected light can be obtained that spreads over a broad range.

As shown in FIGS. 4A and 4B in comparison, more recesses are formed in the reflection section 30 of Preferred Embodiment 1 than in the conventional liquid crystal display device. Since more corner portions are formed with formation of recesses, it becomes possible to form more effective reflection surfaces on the surface of the reflective layer 63, so that more light can be reflected toward the display surface in a broad range. Moreover, the recess 67, the recess 68, and the recess 69 are formed according to the shapes into which the Cs metal layer 56 and the semiconductor layer 62 are shaped. Therefore, the shapes, depths, and slope tilting angles of these recesses can be easily adjusted when shaping the Cs metal layer 56 and the semiconductor layer 62.

Moreover, the reflective layer 63 located inside the recess 67 in Preferred Embodiment 1 is formed on the gate insulating layer 61 or the semiconductor layer 62. On the other hand, in the conventional liquid crystal display device, the reflective layer inside the recesses is formed directly on the glass substrate, neither via the gate insulating layer nor via the semiconductor layer. Therefore, the bottom surfaces of the recesses 67, 68, and 69 of Preferred Embodiment 1 are formed to be shallower than the bottom surfaces of the recesses of the conventional liquid crystal display device.

In the conventional liquid crystal display device, the bottom surfaces of the recesses are formed at deep positions. Therefore, the inner surface of each recess has a large tilting angle, thus making it difficult to form within the recess a large number of effective reflection surfaces having a tilt of about 20 degrees or less. Moreover, these recesses are formed by forming the gate layer 102, the gate insulating layer 104, and the semiconductor layer 106, and then removing these layers altogether. This makes it difficult to control the tilting angle of the inner surface of each recess for increasing the effective reflection surfaces.

In the display device of the present preferred embodiment, a plurality of recesses are formed in accordance with the respective shapes of the Cs metal layer 56 and the semiconductor layer 62. Therefore, when these layers are stacked, the size, relative positioning, and the like of the apertures can be adjusted. As a result, by controlling the tilt of the reflection surface within the recesses, a large number of effective reflection surfaces having a tilt of about 20 degrees less can be formed, and more light can be reflected toward the display surface.

Figure 18:
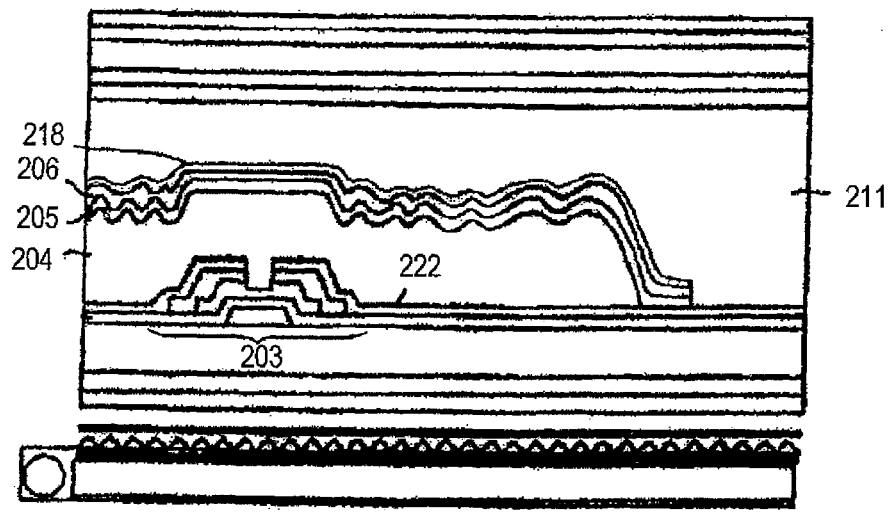
FIG. 18 is a cross-sectional view of a conventional transflective-type liquid crystal display device.
Figure 19A:
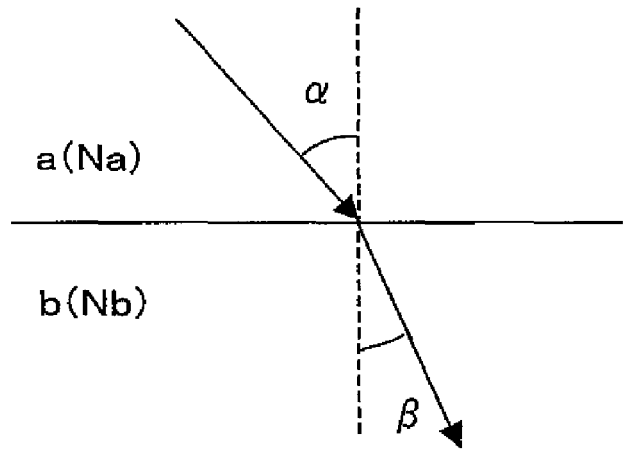
FIGS. 19A and 19B are diagrams showing a relationship between a tilt of a reflection surface and reflected light in a liquid crystal display device, where
Figure 19B:
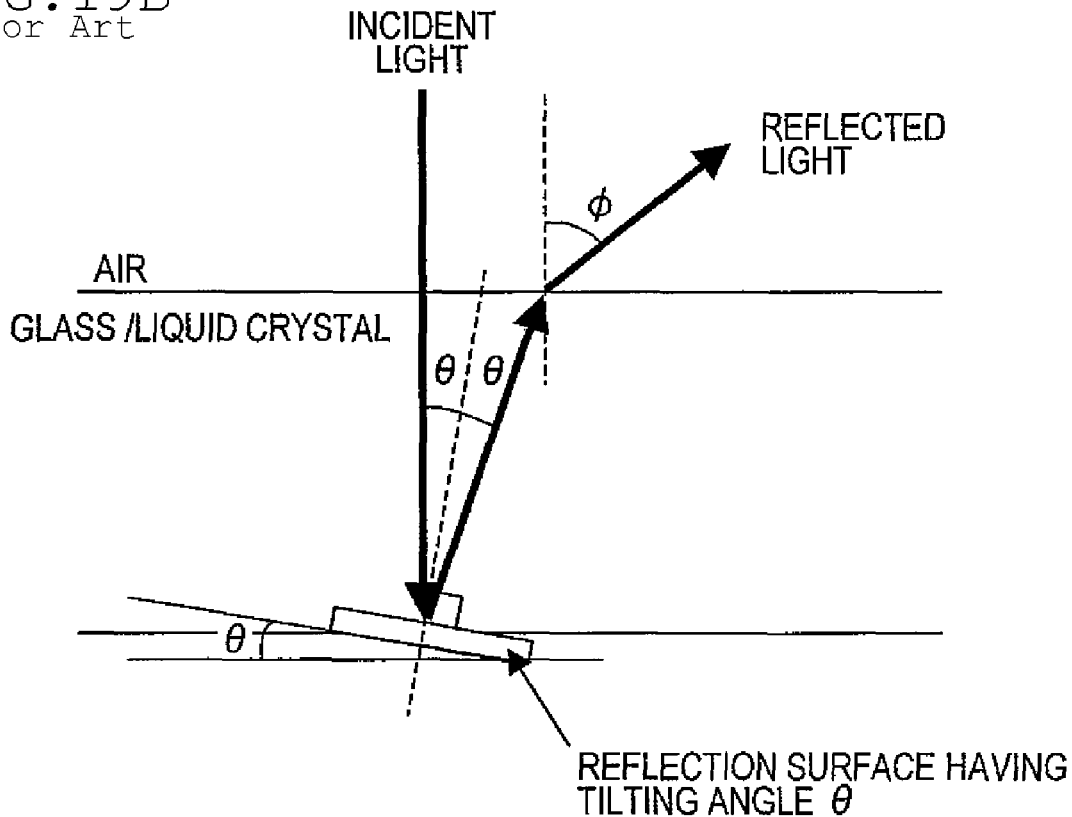

Furthermore, in the liquid crystal display device of the present preferred embodiment, the surfaces of the interlayer insulating layer 26 and the pixel electrode 28 facing the liquid crystal layer 18 do not conform to the shapes of the recess 67, the recess 68, and the recess 69 of the reflective layer 63, but are formed to be flat, as is the surface of the counter electrode 34 facing the liquid crystal layer 18. Therefore, as compared to the conventional transflective-type liquid crystal display device shown in FIG. 18, the electric field applied across the liquid crystal layer 18 becomes more uniform, and it becomes possible to uniformly control the orientation of the liquid crystal in the reflection region 42 in a desired direction. Moreover, since no level differences are formed on the pixel electrode 28 near the end of the reflection section 30, the orientation of the liquid crystal is not disturbed. Therefore, according to the present preferred embodiment, a liquid crystal display device having a high transmittance and excellent viewing angle characteristics with little display unevenness can be provided.

Next, a production method for the TFT substrate 12 in the reflection region 42 according to Preferred Embodiment 1 will be described.

First, a production method for the Cs metal layer (metal layer) 56 of the reflection section 30 in the reflection region 42 will be described.

Figure 5A:
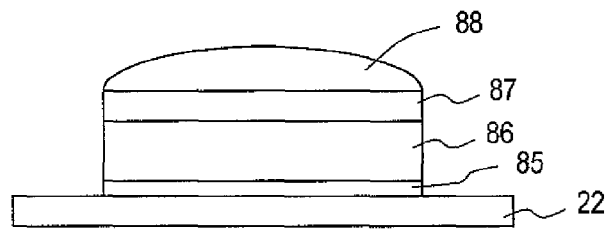
FIGS. 5A and 5B are cross-sectional views showing a production method for a Cs metal layer of Preferred Embodiment 1.
Figure 5B:
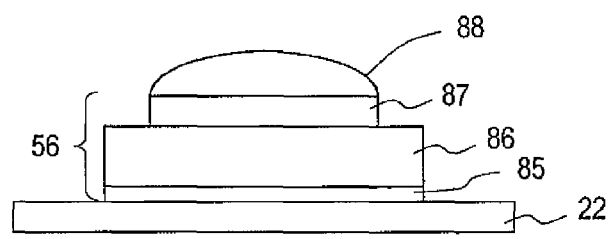

FIGS. 5A and 5B are cross-sectional views for describing the production method for the Cs metal layer 56 of the reflection section 30. As shown in FIG. 5A, when producing the Cs metal layer 56, first, a Ti (titanium) film 85, an Al (aluminum) film 86, and a TiN (titanium nitride) film 87 are formed in this order on the transparent substrate 22 that has been cleaned. The thicknesses of the Ti film 85, the Al film 86, and the TiN film 87 are, respectively, approximately 30 nm, 200 nm, and 150 nm, for example.

Thereafter, a patterned resist film 88 is formed on this multilayer structure, and a dry etching is performed with an RIE apparatus (reactive ion etching apparatus), using $CL_2$/Ar gas. The etching conditions at this time are: a gas pressure of 10 mTorr and a power (ion acceleration power) of 2000 W, with a gas flow rate of $CL_2$/Ar=550/100 sccm.

Next, as shown in FIG. 5B, while edging back the resist film 88, etching is performed by using $CF_4/O_2$ gas. The etching conditions at this time are: a gas pressure of 100 mTorr and a power of 1500 W, with a gas flow rate of $CF_4/O_2$=400/100 sccm. Since $CF_4/O_2$ gas is used, the TiN film 87 is etched, but the Al film 86 is hardly etched. Therefore, the Al film 86 and the underlying Ti film 85 remain, and the Cs metal layer 56 having level differences is formed after the resist film 88 is removed. The thickness of the Cs metal layer 56 is about 50 nm to about 1000 nm or less.

In the aforementioned method, instead of the Al film 86, a film using Mo (molybdenum), Ta (tantalum), or an alloy thereof or the like may also be used. In that case, the etching gas and etching conditions are to be selected in accordance with the metal used. Note that the apparatus used for etching is not limited to an RIE apparatus, but any other type of etching apparatus can also be used.

Note that, after edging back the resist film 88 through ashing, the aforementioned step described with reference to FIG. 5B may be repeated, whereby a Cs metal layer 56 having even more level differences can be produced. By using such a Cs metal layer 56, reflection surfaces with even more level differences can be formed on the surface of the reflective layer 63.

Next, with reference to FIGS. 6A-6E and FIGS. 7A-7E, a production method for the entire TFT substrate 12 in the reflection region 42 will be described.

FIGS. 6A-6E are plan views showing a production process of the TFT substrate 12 in the reflection region 42. FIGS. 7A-7E are cross-sectional views showing a production process of the TFT substrate 12 in the reflection region 42 (a portion shown at arrow B in FIG. 2B).

Figure 6A:
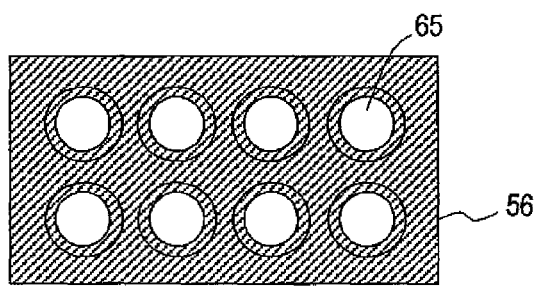
FIGS. 6A-6E are plan views showing a production method for a reflection section of Preferred Embodiment 1.
Figure 7A:
FIGS. 7A-7E are cross-sectional views showing a production method for a reflection section of Preferred Embodiment 1.

As shown in FIG. 6A and FIG. 7A, first, the Cs metal layer 56 having level differences as described with reference to FIG. 5 is formed on the transparent substrate 22 in the reflection region 42. At this time, a plurality of apertures 65 are formed in the Cs metal layer 56. In this step, the gate lines (gate metal layer) 54 shown in FIG. 2A and the gate metal layer 54 of the TFT section 32 shown in FIG. 3A are also formed from the same metal concurrently.

Figure 6B:
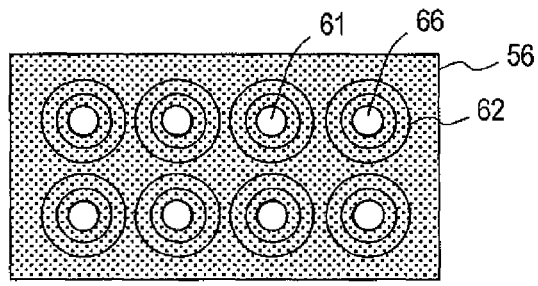
Figure 7B:
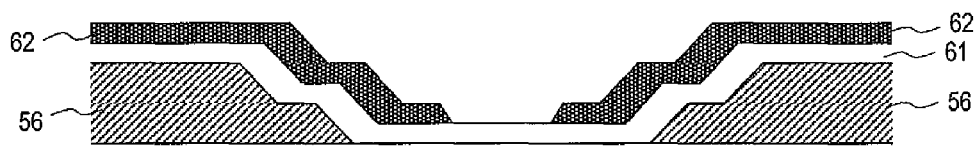

Next, as shown in FIG. 6B and FIG. 7B, by using P-CVD technique and a gaseous mixture of $SiH_4$, $NH_3$, and $N_2$, the gate insulating layer 61 composed of SiN (silicon nitride) is formed across the entire substrate surface. The gate insulating layer 61 may also be composed of $SiO_2$ (silicon oxide), $Ta_2O_5$ (tantalum oxide), $Al_2O_3$ (aluminum oxide), or the like. The thickness of the gate insulating layer 61 preferably is about 100 nm to about 600 nm, for example. In this step, the gate insulating layer 61 of the TFT section 32 shown in FIG. 3B is also formed concurrently.

Next, on the gate insulating layer 61, an amorphous silicon (a-Si) film and an $n^+$a-Si film obtained by doping amorphous silicon with phosphorus (P). The thickness of the a-Si film preferably is about 30 nm to about 300 nm, and the thickness of the n⁺a-Si film preferably is about 20 nm to about 100 nm, for example. Thereafter, these films are shaped by photolithography technique, whereby the semiconductor layer 62 is formed.

At this time, a plurality of apertures 66 are formed in the semiconductor layer 62. The apertures 66 of the semiconductor layer 62 are formed above the apertures 65 of the Cs metal layer 56, and are formed to be inside the apertures 65 in a manner of concentric circles with the apertures 65 as seen from above the plane of the substrate. Note that, in this step, the semiconductor layer 62 of the TFT section 32 shown in FIG. 3B is also formed concurrently.

Figure 6C:
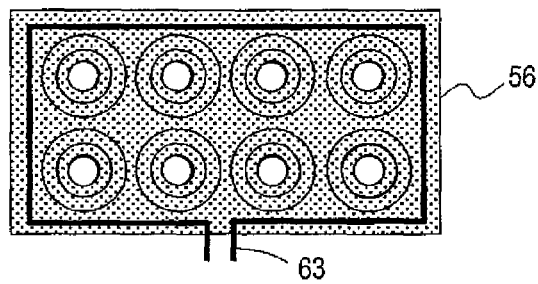
Figure 7C:
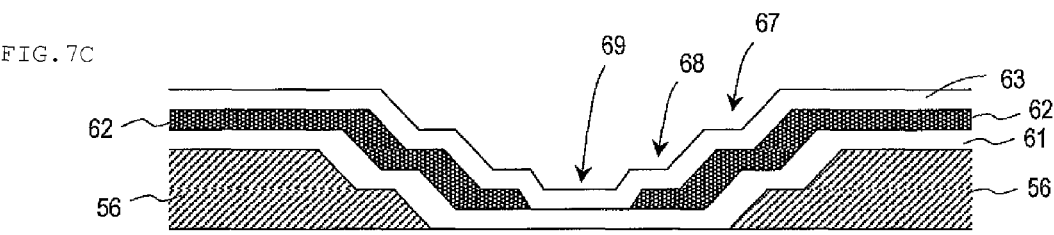

Next, as shown in FIG. 6C and FIG. 7C, a thin metal film of Al or the like is formed across the entire substrate surface by sputtering technique or the like, and the reflective layer 63 is formed. For the thin metal film, the materials which are mentioned above as materials for the Cs metal layer 56 may be used. The thickness of the reflective layer 63 preferably is about 30 nm to about 1000 nm or less, for example.

At this time, the aforementioned recesses 67 and the recesses 68 are formed on the surface of the reflective layer 63 above the apertures 65 of the Cs metal layer 56, and the recesses 69 are formed on the surface of reflective layer 63 above the apertures 66 of the semiconductor layer 62.

Note that, in this step, the reflective layer 63 of the TFT section 32 shown in FIG. 3B is also formed concurrently. In the TFT section 32, the reflective layer 63 forms a source electrode and a drain electrode of the TFT. Also at this time, the source lines 52 in FIG. 2A may be formed as portions of the reflective layer 63.

Figure 6D:
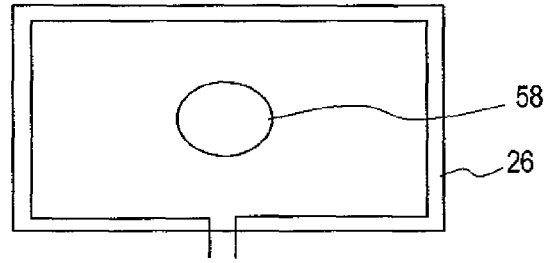
Figure 7D:
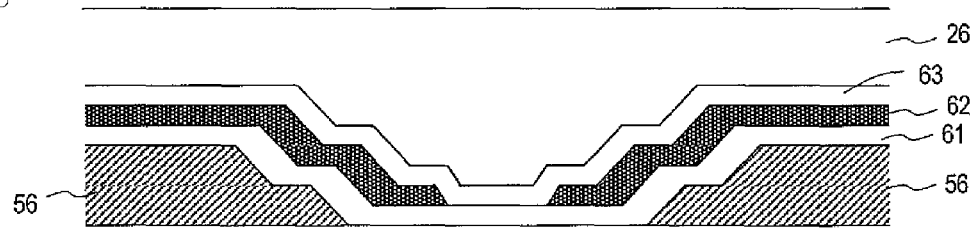

Next, as shown in FIG. 6D and FIG. 7D, a photosensitive acrylic resin is applied by spin-coating, whereby the interlayer insulating layer (interlayer resin layer) 26 is formed. The thickness of the interlayer insulating layer 26 preferably is about 0.3 μm to about 5 μm or less, for example. Although a thin film such as SiNx or SiO₂ may be formed by P-CVD technique as a protection film between the reflective layer 63 and the interlayer insulating layer 26, such is omitted from the figure. The thickness of the protection film preferably is about 50 nm to about 1000 nm or less, for example. The interlayer insulating layer 26 and the protection film are formed not only on the reflection region 42, but also on the entire upper surface of the transparent substrate 22 including the TFT region 44. Thereafter, through a development process using an exposure apparatus, a contact hole 58 is formed near the center of the reflection section 30.

Figure 6E:
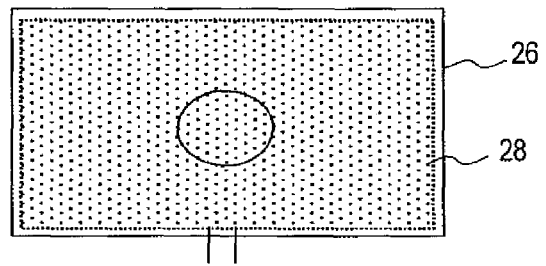
Figure 7E:
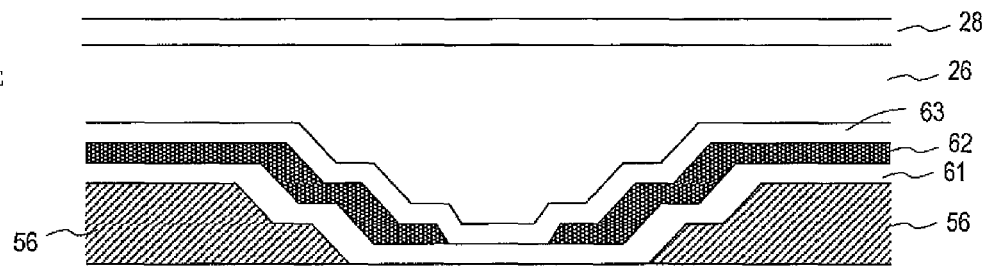

Next, as shown in FIG. 6E and FIG. 7E, on the interlayer insulating layer 26, a transparent electrode film composed of ITO, IZO, etc., is formed by a sputtering technique or the like. This transparent electrode film is pattern shaped by photolithography technique, whereby the pixel electrode 28 is formed. The pixel electrode 28 is formed not only in the reflection region 42, but also on the entire upper surface of the pixel including the TFT region 44.

In the reflection region 42, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected with the pixel electrode 28 via the contact hole 58.

Preferably, as many recesses 67, 68, and 69 as possible are formed. Therefore, it is preferable that as many apertures in the Cs metal layer 56 and the semiconductor layer 62 as possible are formed on the reflection surfaces, within the limits of the mask and photoexposure in the production steps. The preferable size of the apertures in the Cs metal layer 56 and the semiconductor layer 62 is about 2 μm to about 10 μm in diameter, for example. In the aforementioned step, the upper surface of the interlayer insulating layer 26 and the surface of the pixel electrode 28 are formed to be flat, without conforming to the shapes of the recesses 67, the recesses 68, and the recesses 69 in the reflective layer 63.

Next, with reference to the drawings, a first variant of the production method of Preferred Embodiment 1 will be described. The production method according to the first variant differs from the above-described production method in terms of the method of producing the Cs metal layer 56. The methods of producing the other portions are the same as those described above.

Figure 8A:
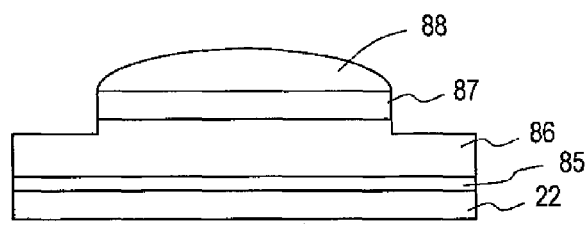
FIGS. 8A-8C are cross-sectional views showing a first variant of a production method for the Cs metal layer of Preferred Embodiment 1.
Figure 8B:
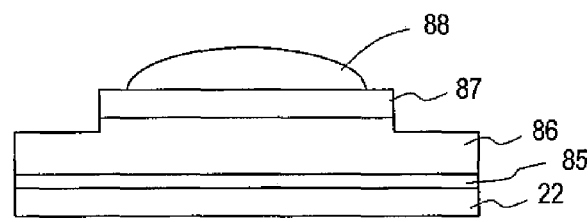
Figure 8C:
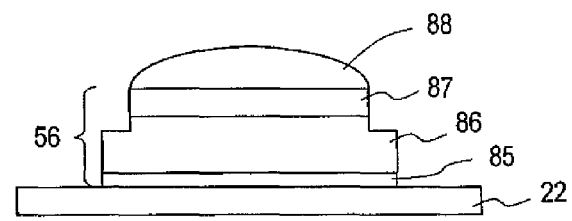

FIGS. 8A-8C are cross-sectional views for describing the first variant of the production method of the Cs metal layer 56 in the reflection section 30. First, as shown in FIG. 8A, a Ti (titanium) film 85, an Al (aluminum) film 86, and a TiN (titanium nitride) film 87 are formed in this order on the transparent substrate 22. The thicknesses of the Ti film 85, the Al film 86, and the TiN film 87 are, respectively, approximately 30 nm, 200 nm, and 150 nm, for example.

Thereafter, a resist film 88 is formed on this multilayer structure, and dry etching is performed with an RIE apparatus, using $CL_2$/Ar gas. The conditions at this time are: a gas pressure of 10 mTorr and an ion acceleration power of 2000 W, with a gas flow rate of $CL_2$/Ar=550/100 sccm.

In this etching step, the TiN film 87 is all removed where it is not covered by the resist film 88, whereas only a portion of the Al film 86 is removed. Therefore, a portion of the AL film 86 and the Ti film 85 remain without being etched.

Next, as shown in FIG. 8B, only the resist film 88 is edged back via ashing using $O_2$ gas. The conditions at this time are: a gas pressure of 300 mTorr and an ion acceleration power of 1500 W, with a gas flow rate of $O_2$=500 sccm.

Next, as shown in FIG. 8C, a dry etching using $CL_2$/Ar gas is performed, whereby the TiN film 87 is all removed where it is not covered by the resist film 88. At this time, the etching process is stopped before the Al film 86 and the Ti film 85 in the region not covered by the resist film 88 are entirely removed. As a result, the Cs metal layer 56 having level differences is formed. The etching conditions at this time are: a gas pressure 10 mTorr and an ion acceleration power of 2000 W, with a gas flow rate of $CL_2$/Ar=500/100 sccm.

In the above method, instead of the Al film 86, a film using Mo (molybdenum), Ta (tantalum), or an alloy thereof or the like may also be used. In that case, the etching gas and etching conditions that are suitable for the metal used is to be selected. Note that the apparatus used for etching is not limited to an RIE apparatus, but any other type of etching apparatus can also be used.

Note that, after edging back the resist film 88 through ashing, the aforementioned step may be repeated, whereby a Cs metal layer 56 having even more level differences can be produced. By using such a Cs metal layer 56, reflection surfaces with even more level differences can be formed on the surface of the reflective layer 63.

Next, with reference to the drawings, a second variant of the production method of Preferred Embodiment 1 will be described. Also, the production method according to the second variant differs from the production method of Preferred Embodiment 1 only with respect to the method of producing the Cs metal layer 56, and methods of producing the other portions are the same as those described above.

Figure 9:
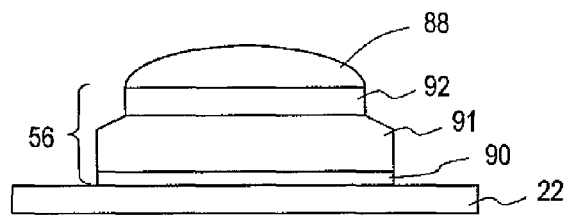
FIG. 9 is a cross-sectional view showing a second variant of a production method for the Cs metal layer of Preferred Embodiment 1.

FIG. 9 is a cross-sectional view for describing the second variant of the production method of the Cs metal layer 56 in the reflection section 30. As shown in the figure, first, a TaN (tantalum nitride) film 90, a Ta (tantalum) film 91, and a TiN (titanium nitride) film 92 are formed in this order on the transparent substrate 22. The thicknesses of the TaN film 90, the Ta film 91, and the TiN film 92 preferably are, respectively, approximately 70 nm, 210 nm, and 110 nm, for example.

Thereafter, a resist film 88 is formed on this multilayer structure, and dry etching is performed with an RIE apparatus, using $CF_4/O_2$ gas. The conditions at this time are: a gas pressure of 400 mTorr and an ion acceleration power of 1100 W, with a gas flow rate of $CF_4/O_2$=474/126 sccm.

In this etching step, since etching is performed by using $CF_4/O_2$ gas, the TiN film 92 experiences a faster etching rate and therefore becomes more etched than the TaN film 90 and the Ta film 91. Hence, by setting an appropriate etching time, the Cs metal layer 56 having level differences as shown in the figure is formed.

With this method, the Cs metal layer 56 having level differences can be formed through a single etching step, and therefore the production time can be reduced. Note that, after edging back the resist film 88 through ashing, the aforementioned step may be repeated, whereby a Cs metal layer 56 having even more level differences can be produced. By using such a Cs metal layer 56, reflection surfaces with even more level differences can be formed on the surface of the reflective layer 63.

Preferred Embodiment 2

Next, a second preferred embodiment of the liquid crystal display device according to the present invention will be described. The liquid crystal display device of the present embodiment differs from the above-described preferred embodiment only with respect to the construction of the gate metal layer 54 and the Cs metal layer 56, and is identical to Preferred Embodiment 1 except for the points described below. Constituent elements which are identical to the constituent elements in Preferred Embodiment 1 will be denoted by the same reference numerals, and the detailed descriptions thereof are omitted.

Figure 10:
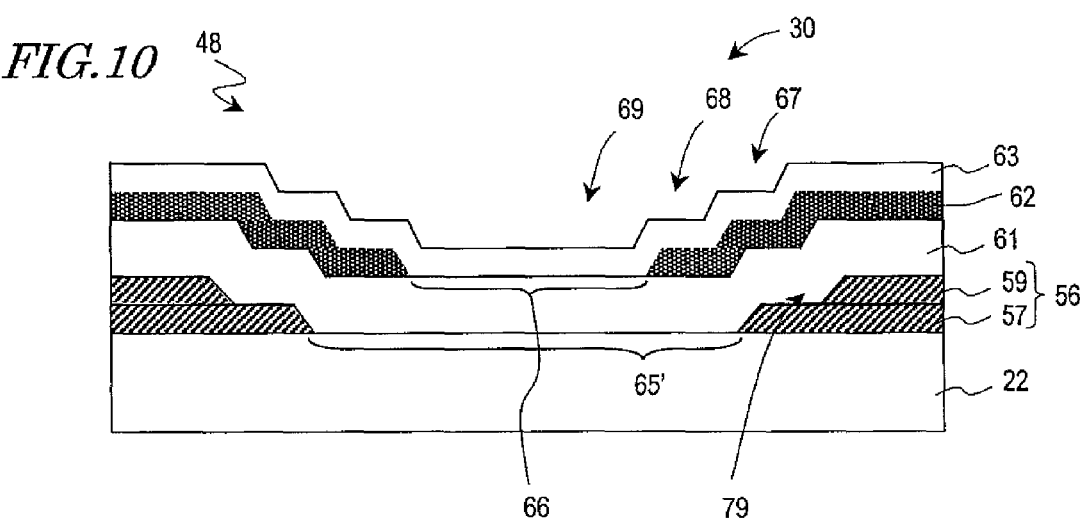
FIG. 10 is a cross-sectional view showing the construction of a reflection section of Preferred Embodiment 2.

FIG. 10 shows a cross section of the recess 48 in the reflection section 30 of Preferred Embodiment 2 (a cross section of a portion shown at arrow B in FIG. 2B). As shown in the figure, the Cs metal layer 56 in the reflection section 30 is composed of a first metal layer 57 and a second metal layer 59 formed on the first metal layer 57. The first metal layer 57 is composed of aluminum (Al), for example, and the second metal layer 59 is composed of molybdenum (Mo), for example. Although omitted from the figure, the gate metal layer 54 in the TFT section 32 also has a multilayer structure of the first metal layer 57 and the second metal layer 59.

The first metal layer 57 has an aperture 65', and the second metal layer 59 has an aperture 79. The aperture 65' is formed inside the aperture 79. On the surface of the reflective layer 63, a recess 69, a recess 68, and a recess 67 are formed, these recesses being dents which are formed according to the aperture 66 of the semiconductor layer 62, the aperture 65' of the first metal layer 57, and the aperture 79 of the second metal layer 59, respectively. Note that the aperture 66 may not be formed in the semiconductor layer 62, in which case the recess 69 is not formed on the surface of the reflective layer 63, so that double dents are formed due to the recess 67 and the recess 68.

FIGS. 11A-11D are cross-sectional views showing a method of forming the Cs metal layer 56 in Preferred Embodiment 2.

Figure 11A:
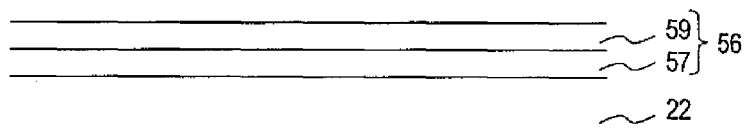
FIGS. 11A-11D are cross-sectional views showing a production method of a Cs metal layer of Preferred Embodiment 2.

First, as shown in FIG. 11A, the first metal layer 57 and the second metal layer 59 are stacked on the transparent substrate 22. The thickness of the first metal layer 57 is, e.g., about 50 nm, and the thickness of the second metal layer 59 is, e.g., about 200 nm.

Figure 11B:
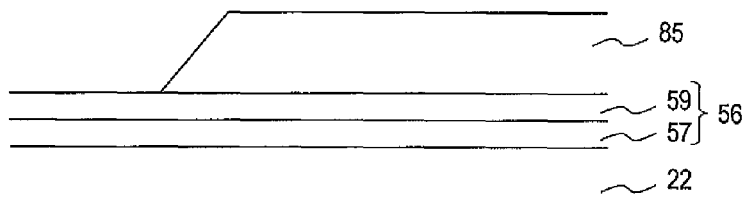

Next, a positive-type resist is applied on the second metal layer 59, for example, and a mask pattern is transferred onto the resist 85 via exposure. After the pattern transfer, removal and cleaning of the resist is performed, whereby the resist 85 as shown in FIG. 11B is formed on the second metal layer 59. In the resist 85, openings for forming apertures in the first metal layer 57 and the second metal layer 59 are formed.

Figure 11C:
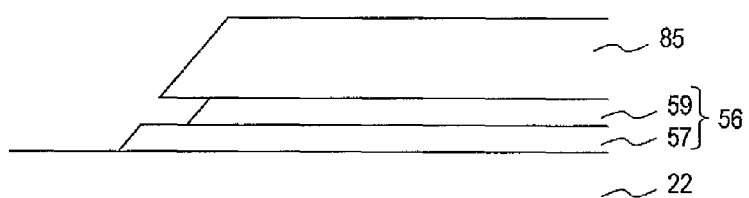

Next, an etching process is performed, and as shown in FIG. 11C, the first metal layer 57 and the second metal layer 59 are removed where they are not covered by the resist 85. Herein, as the etchant, an etchant containing 30 weight % phosphoric acid, 25 weight % nitric acid, 5 weight % acetic acid, and 40 weight % water is preferably used, for example. By using such an etchant, the etching rate of the second metal layer 59 can be made higher than the etching rate of the first metal layer 57. Therefore, step-like slopes are formed such that the side surface of the second metal layer 59 is receding from the side surface of the first metal layer 57.

Figure 11D:
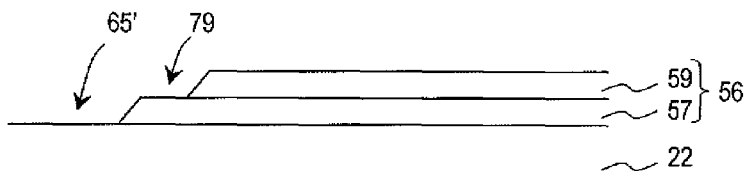

Thereafter, the remaining resist 85 is removed, and formation of the aperture 65' of the first metal layer 57 and the aperture 79 of the second metal layer 59 is completed, as shown in FIG. 11D.

In the aforementioned step of forming the Cs metal layer 56, the gate metal layer 54 is concurrently formed by a similar method. The production of the present preferred embodiment is identical with Preferred Embodiment 1, except for the method of forming the Cs metal layer 56 and the gate metal layer 54, and therefore the descriptions thereof are omitted. According to Preferred Embodiment 2 as above, similar effects to those in Preferred Embodiment 1 can be obtained.

Preferred Embodiment 3

Next, a third preferred embodiment of the liquid crystal display device according to the present invention will be described. The liquid crystal display device of the present preferred embodiment differs from the above-described embodiments only with respect to the construction of the gate metal layer 54, the Cs metal layer 56, and the reflection section 30, and its construction is identical to the above-described preferred embodiments except for the points described below. Constituent elements which are identical to the constituent elements in the above-described preferred embodiments will be denoted by the same reference numerals, and the detailed descriptions thereof are omitted.

Figure 12:
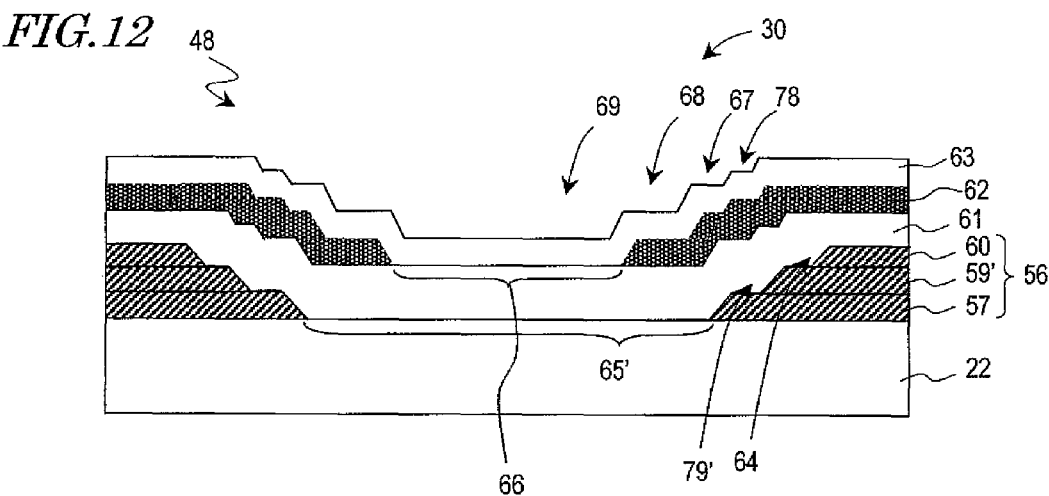
FIG. 12 is a cross-sectional view showing the construction of a reflection section of Preferred Embodiment 3.

FIG. 12 shows a cross section of the recess 48 in the reflection section 30 of Preferred Embodiment 3 (a cross section of a portion shown at arrow B in FIG. 2B). As shown in the figure, the Cs metal layer 56 in the reflection section 30 is includes a first metal layer 57, a second metal layer 59' formed on the first metal layer 57, and a third metal layer 60 formed on the second metal layer 59'. The first metal layer 57 is preferably composed of, e.g., aluminum (Al); the second metal layer 59' is preferably composed of, e.g., molybdenum nitride (MoN) having about 20% nitrogen content; and the third metal layer 60 is preferably composed of, e.g., molybdenum (Mo). Although omitted from the figure, the gate metal layer 54 in the TFT section 32 also has a multilayer structure of the first metal layer 57, the second metal layer 59', and the third metal layer 60.

The first metal layer 57 has an aperture 65'; the second metal layer 59' has an aperture 79'; and the third metal layer 60 has an aperture 64. The aperture 65' is formed inside the aperture 79', and the aperture 79' is formed inside the aperture 64. The recess 69, the recess 68, the recess 67, and the recess 78 are formed on the surface of the reflective layer 63, these recesses being dents which are formed according to the aperture 66 of the semiconductor layer 62, the aperture 65' of the first metal layer 57, the aperture 79' of the second metal layer 59', and the aperture 64 of the third metal layer 60, respectively. Note that the aperture 66 may not be formed in the semiconductor layer 62, in which case the recess 69 is not formed on the surface of the reflective layer 63, so that triple dents are formed due to the recess 68, the recess 67, and the recess 78.

FIGS. 13A-13D are cross-sectional views showing a method of forming the Cs metal layer 56 in Preferred Embodiment 3.

Figure 13A:
FIGS. 13A-13D are cross-sectional views showing a production method for a Cs metal layer of Preferred Embodiment 3.

First, as shown in FIG. 13A, the first metal layer 57, the second metal layer 59', and the third metal layer 60 are stacked on the transparent substrate 22. The thickness of the first metal layer 57 is e.g. about 50 nm; the thickness of the second metal layer 59' preferably is e.g. 50 nm; and the thickness of the third metal layer 60 preferably is, e.g., about 200 nm.

Figure 13B:
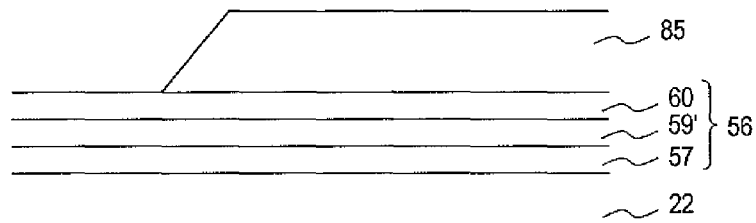

Next, a positive-type resist is applied on the third metal layer 60, for example, and a mask pattern is transferred onto the resist 85 via exposure. After the pattern transfer, removal and cleaning of the resist is performed, whereby the resist 85 as shown in FIG. 13B is formed on the third metal layer 60. In the resist 85, openings for forming apertures in the first metal layer 57, the second metal layer 59', and the third metal layer 60 are formed.

Figure 13C:
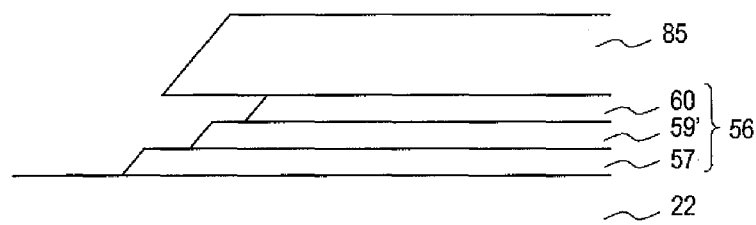

Next, an etching process is performed, and as shown in FIG. 13C, the first metal layer 57, the second metal layer 59', and the third metal layer 60 are removed where they are not covered by the resist 85. Herein, as the etchant, an etchant preferably containing approximately 30 weight % phosphoric acid, 25 weight % nitric acid, 5 weight % acetic acid, and 40 weight % water is used, for example. By using such an etchant, the etching rate of the third metal layer 60 can be made higher than the etching rate of the second metal layer 59', and the etching rate of the second metal layer 59' can be made higher than the etching rate of the first metal layer 57. Therefore, step-like slopes are formed such that the side surface of the third metal layer 60 is receding from the side surface of the second metal layer 59', and that the side surface of the second metal layer 59' is receding from the side surface of the first metal layer 57.

Figure 13D:
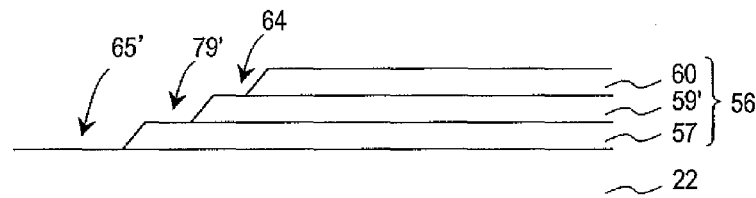

Thereafter, the remaining resist 85 is removed, and as shown in FIG. 13D, formation of the aperture 65' of the first metal layer 57, the aperture 79' of the second metal layer 59', and the aperture 64 of the third metal layer is completed.

In the aforementioned step of forming the Cs metal layer 56, the gate metal layer 54 is concurrently formed by a similar method. The production of the present preferred embodiment is identical with Preferred Embodiment 1, except for the method of forming the Cs metal layer 56 and the gate metal layer 54, and the descriptions thereof are omitted.

According to Preferred Embodiment 3, similar effects to those in Preferred Embodiment 1 can be obtained, but more effective reflection surfaces can be formed from the reflective layer, thus making it possible to provide a better reflection efficiency than in Preferred Embodiment 1.

Preferred Embodiment 4

Next, a fourth preferred embodiment of the liquid crystal display device according to the present invention will be described. The liquid crystal display device of the present embodiment differs from Preferred Embodiment 1 with respect to the construction of the gate metal layer 54 and the Cs metal layer 56, but its construction is identical to Preferred Embodiment 1 except for the points described below. Constituent elements which are identical to the constituent elements in Preferred Embodiment 1 will be denoted by the same reference numerals, and the detailed descriptions thereof are omitted.

Figure 14:
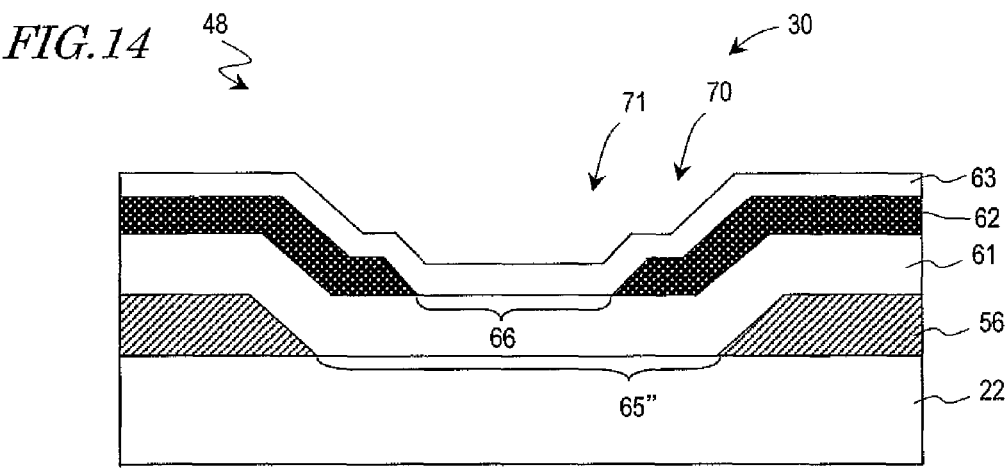
FIG. 14 is a cross-sectional view showing the construction of a reflection section of Preferred Embodiment 4.

FIG. 14 shows a cross section of the recess 48 in the reflection section 30 of Preferred Embodiment 4 (a cross section of a portion shown at arrow B in FIG. 2B). As shown in the figure, an aperture 65" is formed in the Cs metal layer 56 in the reflection section 30, but no level difference is formed on the side surface of the aperture 65". Therefore, on the surface of the reflective layer 63, two recesses 70 and 71 are formed according to the aperture 65" of the Cs metal layer 56 and the aperture 66 of the semiconductor layer 62.

The Cs metal layer 56 is composed of molybdenum nitride (MoN), such that the nitrogen content of molybdenum nitride continuously decreases from the transparent substrate 22 toward the gate insulating layer 61. For example, the nitrogen content is about 25% in the portion which is in contact with the transparent substrate 22, and 0% in the portion which is in contact with the gate insulating layer 61. In this case, the material of the portion which is in contact with the gate insulating layer 61 is molybdenum, which herein may also be referred to as a molybdenum nitride having 0% nitrogen content. Although omitted from the figure, the gate metal layer 54 in the TFT section 32 is also composed of a similar molybdenum nitride.

FIGS. 15A-15D are cross-sectional views showing a method of forming the Cs metal layer 56 according to Preferred Embodiment 4.

Figure 15A:
FIGS. 15A-15D are cross-sectional views showing a production method for the Cs metal layer of Preferred Embodiment 4.

First, as shown in FIG. 15A, with molybdenum nitride (MoN), the Cs metal layer 56 is stacked on the transparent substrate 22 by sputtering, for example. Herein, the Cs metal layer 56 is stacked in such a manner that the nitrogen content of the molybdenum nitride continuously decreases from the transparent substrate 22 toward above, as mentioned above. In other words, when stacking the Cs metal layer 56, the nitrogen content of the molybdenum nitride decreases with time. The thickness of the Cs metal layer 56 preferably is about 300 nm, for example.

Figure 15B:
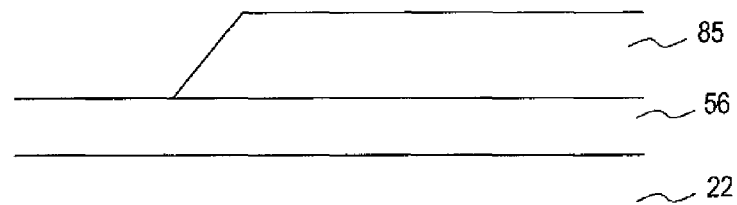

Next, a positive-type resist is applied on the Cs metal layer 56, for example, and a mask pattern is transferred onto the resist 85 via exposure. After the pattern transfer, removal and cleaning of the resist is performed, whereby the resist 85 as shown in FIG. 15B is formed on the Cs metal layer 56. In the resist 85, openings for forming apertures in the Cs metal layer 56 are formed.

Figure 15C:
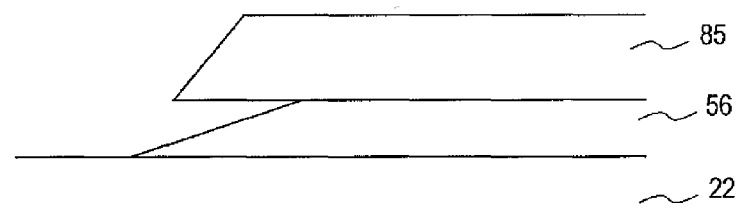

Next, an etching process is performed, and as shown in FIG. 15C, the Cs metal layer 56 is removed where it is not covered by the resist 85. Herein, as the etchant, an etchant preferably containing approximately 30 weight % phosphoric acid, 25 weight % nitric acid, 5 weight % acetic acid, and 40 weight % water is used, for example. By using such an etchant, the etching rate of the Cs metal layer 56 can be made continuously higher from the lower portion toward the upper portion. Therefore, on the side surface of the Cs metal layer 56, a slope with a tilt of about 20 degrees or less with respect to the substrate plane is formed, which continuously recedes from the lower portion toward the upper portion.

Figure 15D:
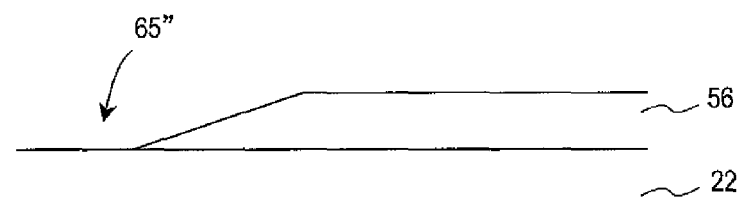

Thereafter, the remaining resist 85 is removed, and as shown in FIG. 15D, formation of the aperture 65" in the Cs metal layer 56 is completed.

In the aforementioned step of forming the Cs metal layer 56, the gate metal layer 54 is concurrently formed by a similar method. The production of the present preferred embodiment is identical with Preferred Embodiment 1, except for the method of forming the Cs metal layer 56 and the gate metal layer 54, and the descriptions thereof are omitted.

According to Preferred Embodiment 4, no level differences are formed in the slope of the Cs metal layer, so that the number of recesses formed in the reflective layer 63 is smaller than in Preferred Embodiment 1. However, virtually all tilt of the slope of the recess 70 can be made 20 degrees or less in accordance with the slope of the Cs metal layer 56, and therefore a reflection efficiency which is substantially the same as, or better than, that of Preferred Embodiment 1 can be obtained.

Preferred Embodiment 5

Hereinafter, with reference to the drawings, a fifth preferred embodiment of the liquid crystal display device according to the present invention will be described. Note that the same reference numerals are attached to those elements which are identical to the constituent elements in the above preferred embodiments, and the descriptions thereof are omitted.

Figure 16:
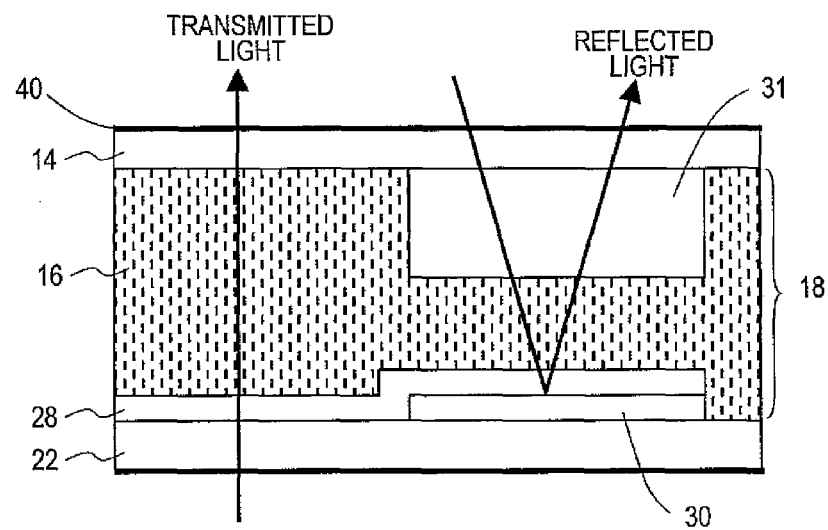
FIG. 16 is a cross-sectional view showing a liquid crystal display device of Preferred Embodiment 5.

FIG. 16 is a diagram schematically showing a cross-sectional shape of the liquid crystal display device of the present preferred embodiment. This liquid crystal display device is based on the liquid crystal display device of Preferred Embodiment 1, 2, 3, or 4 from which the interlayer insulating layer 26 is excluded, and is identical to the display device of Preferred Embodiment 1, 2, 3, or 4 except for the points discussed below. Note that, in FIG. 16, the detailed structure of the counter substrate 14 and the TFT section 32 are omitted from illustration.

As shown in the figure, in Preferred Embodiment 5, the interlayer insulating layer 26 is not formed, and therefore the pixel electrode 28 is formed upon the reflective layer 63 in the reflection section 30 and in the TFT section 32, via an insulating film not shown. The structure and production method for the reflection section 30 and the TFT section 32 are the same as in Preferred Embodiment 1 except that the interlayer insulating layer 26 is eliminated. The pixel layout and wiring structure in the display device are also similar to what is shown in FIG. 2A.

Also with this construction, as in the above-described preferred embodiments, the effective reflection surfaces of the reflective layer 63 are expanded in area, so that more light can be reflected toward the display surface. Note that the Cs metal layer 56 of Preferred Embodiment 1, 2, 3, or 4 (including their variants) described above is applicable also to the Cs metal layer 56 in the reflection section 30 of this preferred embodiment.

In the above-described preferred embodiments, the apertures of the Cs metal layer 56 and the semiconductor layer 62 in the reflection section 30 are preferably formed as concentric circles when seen perpendicularly from the substrate. However, the apertures may be disposed so as to have different centers. Moreover, apertures may overlap at their peripheries, and all or some of the apertures of the Cs metal layer 56 may be formed inside the apertures of the semiconductor layer 62. In these cases, too, a large number of roughened portions of circles or overlapping circles with level differences are formed on the surface of the reflective layer 63, whereby the effective reflection surface can be expanded.

Moreover, in the above-described preferred embodiments, the apertures of the Cs metal layer 56 and the apertures of the semiconductor layer 62 in the reflection section 30 preferably are each formed to be circular or substantially circular. However, some or all of these apertures may be formed to be elliptical or substantially elliptical, or quadrangular or substantially quadrangular. Alternatively, some apertures may be formed to be elliptical or substantially elliptical, while other apertures are formed to be quadrangular or substantially quadrangular. Apertures may be disposed in such a manner that their edges overlap. In these cases, too, a large number of circular, substantially circular, elliptical, substantially elliptical, quadrangular, substantially quadrangular, or overlapping shapes thereof of roughened portions with level differences are formed on the surface of the reflective layer 63, whereby the effective reflection surface can be expanded.

Furthermore, in each of the above-described preferred embodiments, it is preferable that as many recesses of the reflective layer 63 as possible are formed within the reflection section 30. Therefore, the size and shape of each recess are not limited to what is described above, but many shapes are possible, such as polygons other than quadrangles, recesses with sawtoothed edges, or combinations thereof.

In the above-described present preferred embodiment, apertures are preferably formed in the Cs metal layer 56 and the semiconductor layer 62. However, when shaping these layers, protruding layers (or island-like layers) may be formed at the positions of the apertures, by using a pattern in which light shielding portions and transmitting portions are inverted, for example.

In the above-described preferred embodiments, apertures are preferably formed in the semiconductor layer 62. However, recesses may be formed instead of apertures. In that case, too, a large number of recesses are formed on the surface of the reflective layer 63, and effects similar to the effects according to the above-described preferred embodiments are obtained. Moreover, the apertures 66 of the semiconductor layer 62 may not necessarily be formed, in which case the recesses 69 are not formed on the surface of the reflective layer 63. A liquid crystal display device of such a configuration is also encompassed by the liquid crystal display device according to preferred embodiments of the present invention.

As indicated by the above preferred embodiments, the liquid crystal display device according to the present invention has many level differences and corner portions on the surface of the reflective layer, and has many slopes with tilting angles of about 20 degrees or less. Therefore, a reflection region with broad effective reflection surfaces and excellent scattering characteristics can be obtained. Moreover, level differences and corner portions of the reflection surfaces are formed according to the shape of the Cs metal layer and the semiconductor layer when being shaped. Therefore, without increasing the production steps, a reflection region having excellent reflection characteristics can be easily obtained. Therefore, it is possible to provide an inexpensive liquid crystal display device capable of uniform and high-brightness displaying.

Furthermore, according to various preferred embodiments of the present invention, the surface of each pixel electrode facing the liquid crystal layer is formed to be flat, similarly to the surface of the counter electrode, with no level difference being formed in the pixel electrode near the ends of the reflection section. Therefore, the orientation of the liquid crystal can be uniformly controlled to be in a desired direction. Therefore, a liquid crystal display device having a high transmittance and excellent viewing angle characteristics with little display unevenness can be provided.

The liquid crystal display device according to preferred embodiments of the present invention encompasses display apparatuses, television sets, mobile phones, etc., in which a liquid crystal panel is utilized. Moreover, although the present preferred embodiments illustrate transflective-type liquid crystal display devices as examples, a reflection-type liquid crystal display device or the like having a similar configuration to the aforementioned reflection section would also be encompassed as one configuration of the present invention.

Since the liquid crystal display device according to preferred embodiments of the present invention is formed by the above-described production methods, it can be produced with the same materials and steps as those for a transmission-type liquid crystal display device. Therefore, at low cost, a liquid crystal display device having a reflection efficiency can be provided.

According to preferred embodiments of the present invention, transflective-type and reflection-type liquid crystal display devices having a high image quality can be provided at low cost. Liquid crystal display devices according to preferred embodiments of the present invention can be suitably used for various liquid crystal display devices, and suitably used for transflective-type and reflection-type liquid crystal display devices which perform display by utilizing reflected light, e.g., mobile phones, onboard display device such as car navigation systems, display devices of ATMs and vending machines, etc., portable display devices, laptop PCs, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display device comprising:
   a reflection region arranged to reflect incident light toward a display surface; wherein
   the reflection region includes a reflective layer located on a substrate;
   the reflection region includes a first recess formed on a surface of the reflective layer, a second recess formed on the surface of the reflective layer in the first recess, and a third recess formed on the surface of the reflective layer in the second recess;
   the second recess is formed at a level lower than a level of the first recess; and
   the third recess is formed at a level lower than the level of the second recess; wherein
   a metal layer having an aperture is located under the reflective layer in the reflection region;
   an insulating layer is located above the metal layer and the aperture of the metal layer;
   a semiconductor layer having an aperture is located above the insulating layer; and
   the aperture of the semiconductor layer is located inside the aperture of the metal layer.

2. The liquid crystal display device of claim 1, wherein a surface which is substantially parallel to the plane of the substrate is located on the surface of the reflective layer inside the first recess but outside the second recess.

3. The liquid crystal display device of claim 1, wherein a surface which is substantially parallel to the plane of the substrate is located on the surface of the reflective layer inside the second recess but outside the third recess.

4. The liquid crystal display device of claim 1, wherein the metal layer has a first portion and a second portion which is thicker than the first portion.

5. The liquid crystal display device of claim 1, further comprising a semiconductor device located on the substrate, wherein, the metal layer, the semiconductor layer, and the reflective layer are composed of same materials as those of a gate electrode, a semiconductor portion, and source and drain electrodes of the semiconductor device.

6. The liquid crystal display device of claim 1, wherein a plurality of the first recesses, second recesses, and third recesses are formed in the reflection region.

7. The liquid crystal display device of claim 1, wherein at least one of the first recess, the second recess, and the third recess has a substantially circular shape.

8. The liquid crystal display device of claim 1, wherein at least one of the first recess, the second recess, and the third recess has a substantially elliptical shape.

9. The liquid crystal display device of claim 1, wherein at least one of the first recess, the second recess, and the third recess has a substantially quadrangular shape.

10. The liquid crystal display device of claim 1, further comprising a liquid crystal layer and an interlayer insulating layer and a pixel electrode provided between the liquid crystal layer and the reflective layer, wherein a surface of the pixel electrode facing the liquid crystal layer is flat, without conforming to shapes of the first recess, the second recess, and the third recess of the reflective layer.

11. The liquid crystal display device of claim 1, wherein the metal layer includes a first metal layer and a second metal layer which is located above the first metal layer and composed of a material different from that of the first metal layer; the first metal layer and the second metal layer each have an aperture; and the aperture of the first metal layer is formed inside the aperture of the second metal layer.

12. The liquid crystal display device of claim 11, wherein the first metal layer is composed of aluminum and the second metal layer is composed of molybdenum.

13. The liquid crystal display device of claim 11, wherein the metal layer includes a third metal layer which is formed above the second metal layer and composed of a material different from those of the first metal layer and the second metal layer; the third metal layer has an aperture; and the aperture of the second metal layer is formed inside the aperture of the third metal layer.

14. The liquid crystal display device of claim 13, wherein the first metal layer is composed of aluminum; the second metal layer is composed of molybdenum nitride; and the third metal layer is composed of molybdenum.

15. A liquid crystal display device comprising:
   a reflection region arranged to reflect incident light toward a display surface; wherein
   the reflection region includes a metal layer having an aperture, a semiconductor layer located above the metal layer and having an aperture, and a reflective layer located above the semiconductor layer;
   the reflection region includes a first recess formed on a surface of the reflective layer, and a second recess formed on the surface of the reflective layer in the first recess;
   one of the first recess and the second recess is arranged according to the aperture of the metal layer, and the other of the first recess and the second recess is arranged according to the aperture of the semiconductor layer;
   a side surface of the aperture of the metal layer includes a plane whose tilting angle with respect to the display surface is about 20 degrees or less;
   the metal layer has a composition which changes along a thickness direction of the metal layer;
   the metal layer is composed of molybdenum nitride; and
   a nitrogen content in the molybdenum nitride of the metal layer changes along the thickness direction of the metal layer.

16. A production method for a liquid crystal display device having a reflection region for reflecting incident light toward a display surface, comprising:
- a step of forming a metal layer having an aperture and including a first portion and a second portion which is thicker than the first portion, in the reflection region;
- a step of forming an insulating layer, above the metal layer and the aperture of the metal layer;
- a step of forming a semiconductor layer having an aperture, above the insulating layer; and
- a step of forming a reflective layer, above the semiconductor layer and the aperture of the semiconductor layer; wherein
- at least part of the metal layer is composed of molybdenum nitride; and
- a nitrogen content in the molybdenum nitride of the metal layer changes along a thickness direction of the metal layer.

17. The production method of claim 16, wherein the aperture of the semiconductor layer is formed inside the aperture of the metal layer.

18. The production method of claim 16, wherein a first recess is formed on a surface of the reflective layer; a second recess is formed on the surface of the reflective layer inside the first recess; and a third recess is formed on the surface of the reflective layer inside the second recess.

19. The production method of claim 18, wherein the first recess is formed on the surface of the reflective layer above the aperture of the metal layer.

20. The production method of claim 18, wherein the third recess is formed on the surface of the reflective layer above the aperture of the semiconductor layer.

21. The production method of claim 18, further comprising a step of forming an interlayer insulating layer above the reflective layer and a step of forming a pixel electrode above the interlayer insulating layer, wherein a surface of the pixel electrode is formed to be flat, without conforming to shapes of the first recess, the second recess, and the third recess of the reflective layer.

22. The production method of claim 16, wherein the metal layer and the semiconductor layer each have a plurality of apertures.

23. The production method of claim 16, wherein at least one of the aperture of the metal layer and the aperture of the semiconductor layer has a substantially circular shape.

24. The production method of claim 16, wherein at least one of the aperture of the metal layer and the aperture of the semiconductor layer has a substantially elliptical shape.

25. The production method of claim 16, wherein at least one of the aperture of the metal layer and the aperture of the semiconductor layer has a substantially quadrangular shape.

26. The production method of claim 16, wherein the liquid crystal display device includes a semiconductor device, and a gate electrode of the semiconductor device is formed in the step of forming the metal layer, a semiconductor section of the semiconductor device is formed in the step of forming the semiconductor layer, and source and drain electrodes of the semiconductor device are formed in the step of forming the semiconductor device.

27. The production method of claim 16, wherein, the step of forming the metal layer includes a step of forming a first metal layer and a step of forming, from a material which is different from that of the first metal layer, a second metal layer above the first metal layer; an aperture is formed in each of the first metal layer and the second metal layer; and the aperture of the first metal layer is formed inside the aperture of the second metal layer.

28. The production method of claim 27, wherein the first metal layer is composed of aluminum, and the second metal layer is composed of molybdenum.

29. The production method of claim 27, wherein the step of forming the metal layer includes a step of forming a third metal layer above the second metal layer from a material which is different from those of the first metal layer and the second metal layer, and an aperture is formed in the third metal layer, and the aperture of the second metal layer is located inside the aperture of the third metal layer.

30. The production method of claim 29, wherein, the first metal layer is composed of aluminum; the second metal layer is composed of molybdenum nitride; and the third metal layer is composed of molybdenum.

31. A production method for a liquid crystal display device having a reflection region for reflecting incident light toward a display surface, comprising:
- a step of forming a metal layer having a first portion and a second portion which is thicker than the first portion, in the reflection region;
- a step of forming an insulating layer, above the metal layer;
- a step of forming a semiconductor layer, above the insulating layer; and
- a step of forming a reflective layer, above the semiconductor layer, wherein,
- a slope having a level difference is formed in the metal layer, and, on a surface of the reflective layer, a first recess and a second recess which is located in the first recess are formed according to the slope of the metal layer;
- at least part of the metal layer is composed of molybdenum nitride; and
- a nitrogen content in the molybdenum nitride of the metal layer changes along a thickness direction of the metal layer.

32. A production method for a liquid crystal display device having a reflection region for reflecting incident light toward a display surface, comprising:
- a step of forming a metal layer having an aperture, in the reflection region;
- a step of forming an insulating layer, above the metal layer;
- a step of forming a semiconductor layer having an aperture, above the insulating layer; and
- a step of forming a reflective layer, above the semiconductor layer, wherein,
- on a surface of the reflective layer, a first recess and a second recess which is located in the first recess are formed according to the aperture of the metal layer and the aperture of the semiconductor layer;
- a side surface of the aperture of the metal layer is formed so as to include a plane whose tilting angle with respect to the display surface is about 20 degrees or less;
- the metal layer is composed of molybdenum nitride; and
- in the step of forming the metal layer, a composition of the metal layer changes along a thickness direction of the metal layer and a nitrogen content in the molybdenum nitride of the metal layer decreases with time.

* * * * *